(12) United States Patent
Hansen

(10) Patent No.: US 6,470,490 B1
(45) Date of Patent: *Oct. 22, 2002

(54) CONTEXTUAL DATA REPRESENTATION AND RETRIEVAL METHOD

(76) Inventor: Victor E. Hansen, 521 Plymouth Rd., Suite 113, Plymouth Meeting, PA (US) 19462

( * ) Notice: Subject to any disclaimer, the term of this patent is extended or adjusted under 35 U.S.C. 154(b) by 0 days.

This patent is subject to a terminal disclaimer.

(21) Appl. No.: 08/113,265

(22) Filed: Aug. 27, 1993

(51) Int. Cl.⁷ ............................................. G06F 9/45
(52) U.S. Cl. ...................................... 717/106; 707/101
(58) Field of Search ................................ 395/601, 611, 395/602, 603, 604, 605, 612, 613, 201, 410; 717/106; 707/101

(56) References Cited

U.S. PATENT DOCUMENTS

| | | | | |
|---|---|---|---|---|
| 4,817,036 A | * | 3/1989 | Millett et al. ................ | 364/900 |
| 5,187,747 A | * | 2/1993 | Capello et al. .............. | 382/124 |
| 5,197,005 A | * | 3/1993 | Shwartz et al. ............. | 364/419 |
| 5,251,268 A | * | 10/1993 | Colley et al. ................ | 706/49 |
| 5,455,958 A | * | 10/1995 | Flurry et al. ................. | 710/65 |
| 5,481,704 A | * | 1/1996 | Pellicano .................... | 395/600 |
| 5,555,403 A | * | 9/1996 | Cambot et al. ............. | 395/600 |

\* cited by examiner

*Primary Examiner*—Gregory Morse
*Assistant Examiner*—John Q. Chavis
(74) *Attorney, Agent, or Firm*—Lawrence A. Husick, Esq.; Lipton, Weinberger & Husick

(57) ABSTRACT

A method for information representation and retrieval within a general-purpose digital computer. Information of all simple types is represented as points along dimensions, and compound information types are represented as the intersection of two or more dimensions in a multidimensional data space. A context of points is maintained externally, and is used selectively by an evaluator function which is used to return values which are bound to points in this data space, and to invoke conventional data processing functions which interact with the data space. Using the multidimensional representation and retrieval method, the processes and structures of conventional computing, such as variables, arrays, structures, lists, objects, and the like may be modeled or simulated.

27 Claims, 2 Drawing Sheets

1a. Dimension Structure

1b. Point Structure

1c. Intersection Structure 1d,e. Binding Structure

1a. Dimension Structure

1b. Point Structure

1c. Intersection Structure 1d,e. Binding Structure

CONTEXTUAL DATA REPRESENTATION AND RETRIEVAL METHOD

FIELD OF THE INVENTION

The present invention relates to the field of information representation and retrieval within a general-purpose digital computer. Information of all simple (one-dimensional) types is represented as points which are arrayed along dimensions (vectors), and compound information types are represented as the intersection of two or more dimensions in a multidimensional data space. A context, comprising one or more points may be established and maintained locally or globally, for use in evaluation of values within the data space. An evaluator function is used to return values which are bound to points in this data space, and to invoke conventional data processing functions which interact with the data space. The evaluator resolves values by selectively incorporating points from the context on an as-needed basis. Using the contextual representation and retrieval method, the processes and structures of conventional computing, such as variables, arrays, structures, lists, objects, and the like may be modeled or simulated.

BACKGROUND OF THE INVENTION

The representation of information within the memory of a general-purpose digital computer, and the organization and retrieval of that information is one of the classical problems of computing. The mere representation of alphanumeric characters which has become so commonplace was a major advance which required a complex mapping of (at first) seven bit values to corresponding characters and meta-characters in a standard, accepted order. The one-to-one mapping of the values [0,1,2 . . . 126] to the set of characters [NUL, SOH, STX . . . ~] was not a simple task to standardize. It was not until 1965 that such a mapping became the ASCII standard.

The construction of data files using computers began with the sequential file, in which a series of records of a known and fixed length were concatenated together, and could be retrieved by the computation of an "offset" into the file, to arrive at the desired record. Thus, to arrive at the nth record in a file consisting of 80 byte records, one merely discarded the first (n×80) bytes read from the file, and retrieved the 80 bytes immediately following.

Later developments in data retrieval and storage technologies included the indexed sequential file which permitted variable length records without the need for sequential search in order to retrieve a desired record, and most recently, relational databases which use a common "key" field to relate multiple "tables" of information.

When coupled with a high level language capable of manipulating information and indices, the relational database can be a powerful tool for managing information. Each table is usually defined as a two-dimensional array of information, having columns which correspond to fields having a defined type, such as alpha, date, integer, real, and so on, while the rows correspond to individual records within the database. Relations are formed by the matching of values within designated fields of different tables. For instance, a typical business database may have a table for storing information about "people" comprising fields such as: Customer Number, First Name, Middle Initial, Last Name, Street Address, City, State, Zip Code, Telephone Number, and Social Security Number. Another table may list items purchased, and may include fields such as: Item Number, Number Purchased, Date Purchased, Item Price, Discount Applied, and Purchaser Customer Number. By knowing the Customer Number of a given customer (perhaps retrieved after a search for the customer's name in the "people" table, a listing of every item purchased by the customer may be retrieved from the "items purchased" table. Further relations are then possible in such an extended system to determine, for instance, the identity of the manufacturer of a particular item, the count of that item in current stock, and other information necessary to operation of a business.

Packaged together with tools for report formating, data manipulation, and user interface construction, relational databases are sometimes referred to as "Fourth Generation Languages" or simply "4GLs". While such 4GLs have proven application in business computing, they are inadequate for certain "real world" tasks, and are cumbersome for others.

The present invention comprises a method for database retrieval which may be termed "super-relational". It provides for an arbitrarily large number of simple information storage structures which may be combined in large numbers of ways, and economically stored and accessed using convention general-purpose digital computers (as opposed to special-purpose database systems such as the GScan or Teradata computer systems.)

BRIEF DESCRIPTION OF THE INVENTION

In the method of the present invention, all informational entities are treated as points along dimensional lines. For instance, every integer number is treated as a point along an "integer" dimension, every real number as a point along a "real" dimension, and every breed of dog as a point along a "breed_of_dog" dimension. In fact, dimensions can exist for any concept or item which requires representation in a data processing system. All that is required is that every point along a given dimension possess the same quality of interest as all other points along that dimension (consider such dimensions as "red_things" and "fruits").

A point in the method of the present invention is of the notational form:

$$\text{dimension: label}$$

where dimension is the name of the dimension (e.g., integer, real, or fruits), and label specifies a particular point along the named dimension (e.g., "3", "3.14159", or "apple").

A binding in the method of the present invention is an association of a value point $\upsilon$ with the intersection I of two or more other points p within the multidimensional space, so long as no two points are contained along the same dimension. A binding is represented by the notation:

$$[p_1, p_2, \ldots p_n] = \upsilon$$

where the intersection I consists of the points $p_1, p_2, p_n$ enclosed in brackets being bound to the value point $\upsilon$, and defining the intersection at value=$\upsilon$(i.e., $\upsilon$ along the "value" dimension).

It is thus possible to reference a value $\upsilon$ by specifying a set of points $p_1, p_2, \ldots p_n$. A complete intersection is one in which all $p_n$ points are specified, while an incomplete intersection is one in which one or more points are missing.

The context set C in the method of the present invention is a set of points c such that no two points belong to the same dimension. A context is represented using the following notation:

$$[p_1, p_2, \ldots p_n | c_1, c_2, \ldots c_n]$$

which means that the method will evaluate the intersection $p_1, p_2, \ldots p_n$ within the context of points $c_1, c_2, \ldots c_n$. If the intersection specified in $p_1, p_2, \ldots p_n$ is complete, then no further operation need occur. However, if that intersection is incomplete, then one or more points taken from the context C may be used to complete the intersection. For instance, the binding:

$$[a, b, c] = \text{value}$$

cannot be referenced as [a, b] because the intersection is incomplete. Given a context of $$[a, b \,|\, c, d, e]$$

however, the intersection may be evaluated by using c from the context.

At the core of the method of the present invention is the evaluator E, which is a process which, given an intersection I, determines the value $\upsilon$, provided that I is a complete intersection, or is provided with a context C. That is, $$E(I) = \upsilon \text{ or } E(I,C) = \upsilon$$

The context C is preferably maintained externally to the evaluator, and points from the context are selected for use in evaluations on an as-needed basis. The evaluator must also be able to resolve ambiguities, that is, it must be able to choose between two or more possible (and complete) intersections in order to return a single value. Several approaches, such as simple point weighting are possible, and have been proven to be effective in the method of the present invention.

As will be more fully described below, the method of the present invention may be used to provide a function similar to that of a conventional relational database, but it may also be used to function as a programming language, object oriented framework, rule-based expert system shell, list processing engine, and many more extended functions now performed by special purpose hardware and software.

BRIEF DESCRIPTION OF THE DRAWINGS

FIG. 1*c,e* shows a binding structure.

DETAILED DESCRIPTION OF THE INVENTION

Figure 1:
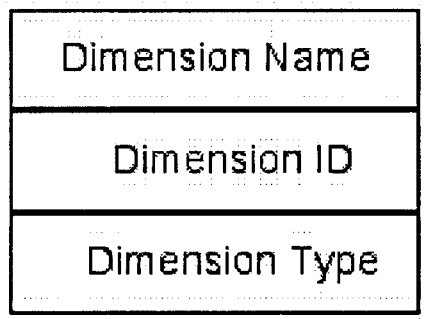
FIG. 1*a* shows a dimension structure.
FIG. 1*b* shows a point structure.
FIG. 1*c* shows an intersection structure.
Figure 1:
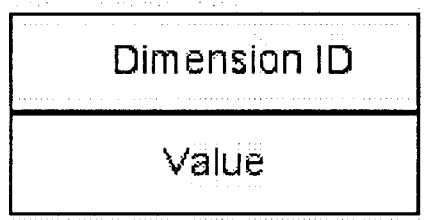
Figure 1:
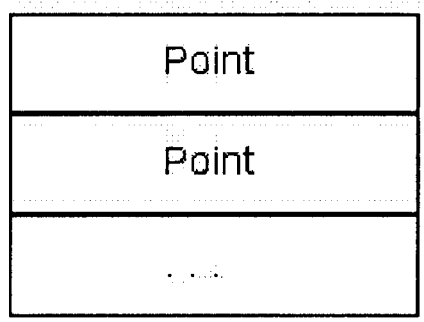
Figure 1:
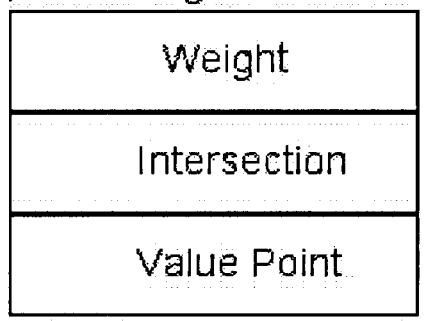
Figure 2:
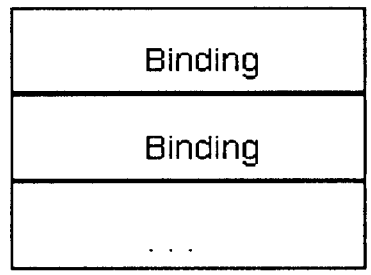
FIG. 2 shows an area structure and a context structure.
Figure 2:
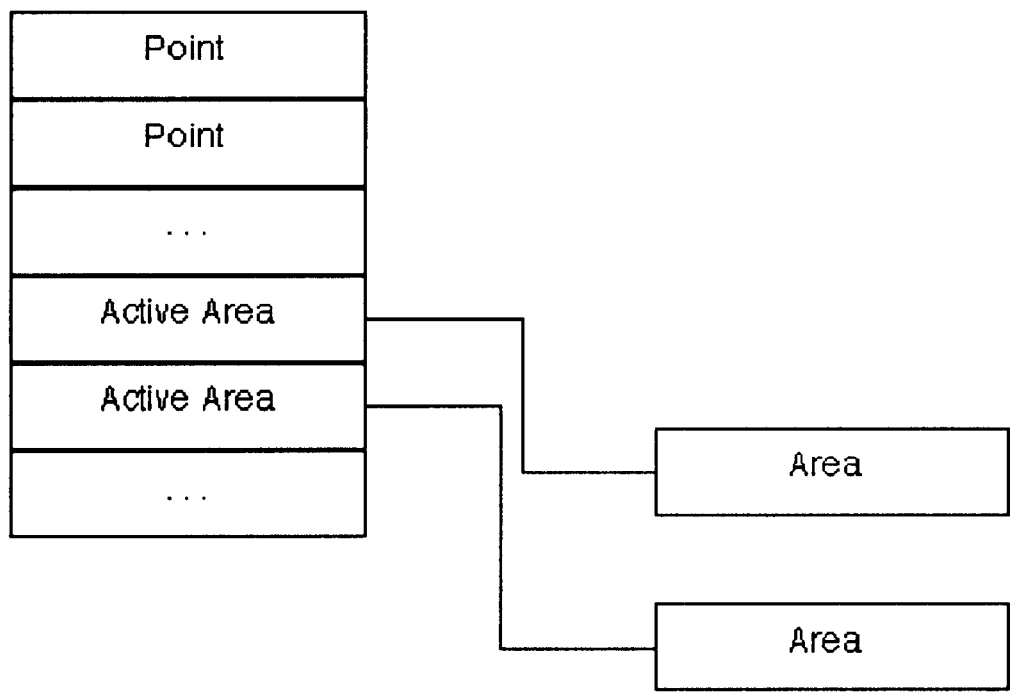

In describing the method of the present invention, several conventions in addition to those outlined above are useful. The following dimensions are used:

The NId (for Name Identification) dimension contains all points used to name things.

These points represent various labels, names, variables and the like used within computer applications.

The Dimension dimension contains a point for each dimension within the multidimensional space.

When it is necessary to have multiple points on a given dimension bound to the same value point, the notational convention used is:

dimension:p1, p2, ... pn which defines an explicit list of points or dimension:p1. . . p2 which defines a range of points or simply dimension:{all} which defines all points on the dimension

---

```
Point Data Structure
#define V4DPI_PntType_Int 0            /* Integer Point Value */
#define V4DPI_PntType_Char 1           /* Character String */
#define V4DPI_PntType_Dict 2           /* Dictionary Entry */
#define V4DPI_PntType_Real 3           /* Real Number */
#define V4DPI_PntType_Isct 4           /* Intersection (Grouping is number of
                                          points in the intersection) */
#define V4DPI_PntType_Foreign 5        /* Foreign data type (ex: qtyuom) */
#define V4DPI_PntType_Special 6        /* Special points (e.g. (ALL), (CURRENT)) */
#define V4DPI_PntType_Shell 7          /* This is a shell for other points */
#define V4DPI_PntType_FrgnDataE1 8     /* Field specification for foreign file */
#define V4DPI_PntType_FrgnStructE1 9   /* Structure specification for a foreign file */
#define V4DPI_PntType_CmpndIsct 10     /* Compound Intersection: dim=[ ... ], [ ... dim= ]
                                          ... */
#define V4DPI_PntType_V3Mod 11         /* V3 Module Call */
#define V4DPI_PntType_V3ModRaw 12      /* V3 Module Call with no translation (points passed "as is") */
#define V4DPI_PntType_Context 13       /* A Context point */
#define V4DPI_PntType_List 14          /* A "special" (internally maintained) list */
#define V4DPI_PntType_Pragma 15        /* A point which holds junk for IntMods,
                                          not to be pushed onto context */
#define V4DPI_PntType_IntMod 16        /* A point which evaluates via internal (to
                                          V4) module */
#define V4DPI_PntType_PntIdx 17        /* A point which points to internal point
                                          buffer ("expanded" by V4) */
#define V4DPI_PntType_MemPtr 18        /* A memory pointer */
#define V4DPI_PntType_V3PicMod 19      /* A V3 PIC module (module stored in same area as point?) */
#define V4DPI_PntType_BigText 20       /* A big text string (see V3PicMod above) */
#define V4DPI_PntType_PIntMod 21       /* Partial Eval IntMod (last argument is continued evaluation) */
#define V4DPI_PntType_Time 22          /* Time/Transaction - Bindings searched in
                                          reverse "chronological" order */
```

-continued

```
#define V4DPI_PntType_Binding 23              /* Binding info - used for erasing/tracking bindings */
#define V4DPI_PntType_Logical 24              /* Logical (Yes/No) */
#define V4DPI_PntVerify_InArea 1              /* Verify point in Area */
#define V4DPI_PntVerify_Dict 2                /* Verify point in dictionary */
#define V4DPI_PntVerify_Range 3               /* Point must be within range */
#define V4DPI_PntVerify_Ref 4                 /* Verify point as REF in another area */
#define V4DPI_Grouping_Single 0               /* Single Point */
/* Numbers 1-12 indicate a mix-list of so many entries */
#define V4DPI_Grouping_All 15                 /* Point represents all points in dimension
                                                 (e.g. dim=all) */
#define V4DPI_Grouping_Current 16             /* Point represents current value of dimension in
                                                 context */
#define V4DPI_Grouping_Binding 17             /* Point represents value of point in binding
                                                 resulting in this intersection */
#define V4DPI_Grouping_List 18                /* Point represents value of point within
                                                 current list iteration */
#define V4DPI_Grouping_Now 19                 /* Point represents "current" time */
#define V4DPI_Grouping_LastBind 20            /* Point represents bind point of last binding */
#define V4DPI_AlphaVal_Max 1024               /* Max bytes in a point value */
#define V4DPI_CharString_Max 250              /* Max bytes in character string */
#define V4DPI_PointHdr_Bytes 8                /* Number of bytes in point header */
#define V4DPI_FormatOpt_ShowDim               /* Show "dim=" in output */
#define V4DPI_FormatOpt_ShowBytes 2           /* Show bytes required to store point */
#define V4DPI_FormatOpt_Trace V4DPI_FormatOpt_ShowDim | V4DPI_FormatOpt_ShowBytes
#define V4DPI_FormatOpt_Default 0
struct V4DPI_Point
{   unsigned short Dim ;                      /* Dimension of this point */
    unsigned short Bytes ;                    /* Number of bytes in this point */
    unsigned char PntType ;                   /* Type of point - see V4DPI_PntType_xxx */
    unsigned char Grouping ;                  /* Grouping of points - see V4DPI_Grouping_xxx */
    unsigned char LHSCnt                      /* If intersection then number of points below
                                                 before "|" i (left-hand-size count) */
    CHARFIELD NestedIsct : 1 ;                /* If this is intersection then TRUE if
                                                 nested intersections within */
    CHARFIELD Quoted : 1 ;                    /* If TRUE then point is "quoted" and should not
                                                 be evaluated */
    union
    {   int IntVal ;
        char *MemPtr ;                        /* Pointer to memory */
        unsigned char AlphaVal[V4DPI_AlphaVal_Max]
    } Value
} ;
typedef struct V4DPI_Point P ;                /* To make life easier */
#define V4DPI_ShortAlphaVal_Max 8
#define V4DPI_ShortPointHdr_Bytes 4
#define V4DPI_Shortpoint_Limit V4DPI_ShortAlphaVal_Max+V4DPI_PointHdr_Bytes
struct V4DPI_ShortPoint                       /* Used for "little points" stored directly within bindlist */
{   unsigned short Dim ;                      /* Dimension of this point */
    unsigned short Bytes ;                    /* Number of bytes in this point */
    unsigned char PntType ;                   /* Type of point - see V4DPI_PntType_xxx */
    union
    {   int IntVal ;
        char AlphaVal[V4DPI_ShortAlphaVal_Max] ;
    } Value ;
} ;
Dimension Data Structure
#define V4DPI_WorkRelHNum 7                   /* RelH for process-specific work area */
#define V4DPI_DimInfo_DimNameMax 31           /* Max bytes in dimension name */
#define V4DPI_DimInfo_RelHReview_Const 1      /* Bindings are defined at dimension
                                                 definition - cannot change */
#define V4DPI_DimInfo_RelHReview_Area 0       /* Review RNum/Category whenever an
                                                 area is loaded or unloaded */
#define V4DPI_DimInfo_RelHReview Bind 2       /* Review with each binding for this
                                                 dimension (VERY EXPENSIVE OPTION!!) */
struct V4DPI_DimInfo
{   union V4IS_KeyPrefix kp ;                 /* Type=V4, SubType=DimInfo, Mode=Int,
                                                 Length=8 */
    int DimId                                 /* Dimension code (actually dictionary entry for
                                                 Dim name) */
    char DimName[V4DPI_DimInfo_DimNameMax+1] ;
    short PointType ;                         /* Type of point allowed for this dimension-
                                                 V4DPI_PntType_xxx */
    short PointVerify ;                       /* How to verify (accept) this point-
                                                 V4DPI_PntVerify_xxx */
    short RangeOK ;                           /* TRUE if point ranges (xxx..yyy) are allowed */
    short ListOK ;                            /* TRUE if point lists (xxx,yyy,zzz) are allowed
                                                 */
    short IsModule ;                          /* TRUE if point links to external (V3) module */
    short UniqueOK ;                          /* If TRUE then allowed to specify point as
```

```
    short DictType ;                                          /* Dictionary type- V4DPI_DictType_xxx */
    int BindList ;                                            /* If TRUE then dimension can become key to
                                                                 BindList entry */
    short ExpandMacro ;                                       /* Number of bytes in macro below (i.e.
                                                                 TRUE if expansion on parse) */
    char Macro_Buf[100+1] ;                                   /* Macro buffer to expand on point acceptance */
    short RelHNum ;                                           /* Relative Heirarchy Number for this dimension
                                                                 (for bindings) */
    char RelHCategory[31+1] ;                                 /* Category code for bindings */
    short RelHReview ;                                        /* How often to review RelHNum/Category-
                                                                 V4DPI_DimInfo_RelHReview_xxx */
    char AcceptorModule[31+1] ;                               /* Name of V3 Acceptor module */
    int AcceptorObject[2] ;                                   /* OBJREF for acceptor module */
    char DisplayerModule[31+1] ;                              /* Name of V3 Displayer module */
    int DisplayerObject[2] ;                                  /* OBJREF for displayer */
                                                              /* Following MUST be at end of dimension info !!!*/
    struct V4DPI_Point AutoCtxPnt ;                           /* If not NULL then point to be used for Auto-
                                                                 Context lookups */
} ;
struct V4DPI_DimUnique                                        /* Structure of record holding next
                                                                 available point number for a dimension */
{   union V4IS_KeyPrefix kp ;                                 /* Type=V4, SubType=DimInfo, Mode=Int,
                                                                 Length=8 */
    int DimId ;                                               /* Dimension code */
    unsigned long NextAvailPntNum ;                           /* Next available number (will have RelH prefix!)
                                                                 [SHOULD BE UNSIGNED!!!] */
} ;
#define V4DPI_PointIntMix_Max 12
struct V4DPI_Point_IntMix                                     /* Defines a list of integer points/ranges */
{ struct ( int BeginInt,EndInt ;                              /* Begin & End in range (end=begin for single) */
          } Entry[V4DPI_PointIntMix_Max] ;
} ;
#define V4DPI_PointAlphaMix_Max 12                            /* Max number of Alpha mixes in point */
struct V4DPI_PointAlphaMix
{   struct  { unsigned short BeginIndex
                unsigned short EndIndex
              } Entry[V4DPI_PointAlphaMix_Max] ;
} ;
union V4DPI_PointMask
{   struct
    {   unsigned AreaId : 8 ;                                 /* Area "owning" point */
        unsigned long PointId : 24 ;                          /* Point Id */
    }   fld ;
    int all ;
} ;
#define XTRHNUMDIM(dimid) (dimid>>13)                         /* Extract heirarch num from
                                                                 dimension ID */
#define ADDHNUMDIM(hnum,dimid) ((hnum<<13) | (dimid&0x1FFF))  /* Add heirarchy
                                                                 number to dimension */
#define XTRHNUMDICT(dictnum) ((((unsigned long)dictnum)>>28)&7) /*Extract hnum from
                                                                 dictionary entry (external) */
#define ADDHNUMDICT (hnum, dictnum) ((hnum<<28) | (dictnum&0x0FFFFFFF))
#define ISDICTEXT(dictnum) ((dictnum>>28)!=0)                 /* TRUE if dictnum is external */
#define MAXDIMNUM 0xFFFF                                      /* Highest allowed dimension number
                                                                 (including 3 bit prefix) */
#define DIMDICT (int *)-1                                     /* Special flag to tell DictEntryGet to
                                                                 look for dimension name */
#define V4DPI_DictType_Dim 1                                  /* A dimension entry */
#define V4DPI_DictType_Int 2                                  /* An internal (to area) entry */
#define V4DPI_DictType_Ext 3                                  /* An external entry (can
                                                                 participate in bindings in other areas) */
#define V4DPI_DictEntryVal_Max 31                             /* Max number of bytes in dictionary entry */
struct V4DPI_DictEntry
{   union V4IS_KeyPrefix kp ;                                 /* Type=V4, SubType=Dict,
                                                                 Mode=Alpha, */
    char EntryVal[V4DPI_DictEntryVal_Max+4] ;                 /* Dictionary entry */
    /* int EntryId ; */                                       /* Corresponding numeric entry
                                                                 (immediately follows EntryVal) */
} ;
struct V4DPI_RevDictEntry
{   union V4IS_KeyPrefix kp ;                                 /* Type=V4, SubType=RevDict,
                                                                 Mode=Int, Len=8 */
    int EntryId ;                                             /* Numeric entry (ref) */
    char EntryVal[V4DPI_DictEntryVal_Max+4] ;                 /* Corresponding Dictionary entry */
};
/* Define special dimensions */
#define Dim_Dim 1                                             /* Dimension dimension */
#define Dim_BindHNum 2                                        /* BindHNum */
```

-continued

```
#define Dim_BindCategory 3
#define Dim_BindLifeTime 4
#define Dim_BindWeight 5
#define Dim_StartDimIndex 10                          /* Starting number for other
                                                         dimensions (must be greater than last above) */

Binding Data Structure
struct V4DPI_Binding
{   union V4IS_KeyPrefix kp ;                         /* Type=V4, SubType=Value, Mode=Int,
                                                         Len=8 */
    int ValueId                                       /* Key to this value (see bindlist
                                                         below for linkage) */
    unsigned short Bytes ;                            /* Number of bytes in this binding */
    unsigned short IsctIndex ;                        /* Index into Buffer for start of intersection */
    int BindWgt ;                                     /* Binding Weight */
    char Buffer[V4IS_BktSize_Max] ;                   /* Value then Isct in here (NOTE: Must be
                                                         "int" aligned!!!) */
} ;
/* Format of BindList (this is rather complicated- schematic below should help */
/* header info (V4DPI_BindList)
    BindList_Value entry                              Points immediate follow
                                                      (Buffer[ValueStart])
    BindList_Value entry                              Multiple points in decreasing weight
    BindList_Value entry                              so that first one to "match" is the one to take
    ...
    BindList_Dim                                      at Buffer[DimStart] & contains list of
                                                      offsets to points below
                                                      (Note: first offset is 0 so that all this can float)
    dim=value point                                   starting at Buffer[PointStart]
    dim=value point                                   these points are one after the
                                                      other, offset by "size" field
    ...
*/
#define V4DPI_BindList_BufMax 10000
struct V4DPI_BindList
{   union V4IS_KeyPrefix kp ;                         /* Type=Binding, AuxVal=Dim,
                                                         key=point, Mode=Int, Len=8 */
    int DimPntVal ;                                   /* Point value (often NId point) */
    unsigned short Bytes ;                            /* Number of bytes in this binding list */
    unsigned short ValueCnt ;                         /* Number of values */
    unsigned short ValueStart;                        /* Starting index below for values */
    unsigned short DimStart ;                         /* Index below to start of dim=value points */
    unsigned short PointCnt ;                         /* Number of dim=value points */
    unsigned short PointStart ;                       /* Start within Buffer below */
    int LUBindId ;                                    /* Last used bind id for this list */
    unsigned char Buffer[V4DPI_BindList_BufMax] ;     /* Data buffer (NOTE: Must be "int"
                                                         aligned) */
} ;
#define V4DPI_IsctDimMax 30                           /* Max number of dimensions in an intersection */
struct V4DPI_BindList_Value
{   struct V4DPI_Shortpoint sp ;                      /* Bind point value (if sp.Bytes ==
                                                         0 then sp.Value.IntVal is ValueId) */
    int BindWgt ;                                     /* Binding Weight */
    unsigned char Bytes ;                             /* Number of bytes (aligned) in this entry */
    unsigned char BindId ;                            /* Binding Id for this value */
    unsigned char IndexCnt ;                          /* Number of index entries below */
    unsigned char DimPos[V4DPI_IsctDimMax] ;          /*, Position in DimEntryIndex below of
                                                         dim=value associated with this value */
} ;
typedef struct V4DPI_BindList_Value BLV ;             /* To make life easier */
#define V4DPI_BindList_DimMax 500                     /* Max dimensions below */
struct V4DPI_BindList_Dim
{   short DimCnt ;                                    /* Number of dimensions indexed below */
    unsigned short DimEntryIndex[V4DPI_BindList_DimMax] ;  /* Index to dim==value point in
                                                              BindList.Buffer */
} ;
struct V4DPI_BindpointVal                             /* Format of Value for a Binding Point */
{   unsigned short Dim ;                              /* Dimension */
    unsigned short BindId ;                           /* Binding Id in list */
    int DimPntVal ;                                   /* Point Value for binding list (these
                                                         first 3 fields used to form key) */
    unsigned short AreaId ;                           /* AreaId of area containing binding list */
} ;
struct V4DPI_EvalList
{   short Init ;                                      /* TRUE if this has been initialized */
    short SkipCnt ;                                   /* Number of calls to skip before returning
                                                         value (0 to return value) */
    short RetumCnt ;                                  /* Number of times to return value */
    short AreaCnt ;                                   /* Number of areas below */
    short AreaMatch ;                                 /* Set by IsctEval to area/nbl below which
```

```
struct
    {   struct V4DPI_BindList *nbl ;              /* Bind list for this area */
        struct V4DPI_BindList_Dim *nbld ;         /* Pointer to dimension list */
        struct V4DPI_BindList_Value *nblv ;       /* Pointer to current value in list */
        int Valx ;                                /* Current value index (0 thru nbl->ValueCnt) */
        int CurWgt ;                              /* Weight of current contender (-1 pick
                                                     next, 0= no more) */
        char DimTest[V4DPI_BindList_DimMax] ;     /* By dimension in nbld, 0=no test, 1=test
                                                     OK, -1=test False */
        int AreaId ;                              /* Area ID */
    } Area[16] ;
} ;
#define V4DPI_AreaBindInfo_Dim_Max 250            /* Max number of dimensions in
                                                     record below */
struct V4DPI_AreaBindInfo
{   union V4IS_KeyPrefix kp ;                     /* Type = V4, Subtype=BindInfo,
                                                     Mode=Int, Len=8 */
    int key ;                                     /* 0 for now */
    unsigned short Bytes ;                        /* Number of bytes in this record */
    short DimCnt ;                                /* Number of dimensions below */
    unsigned short DimsWithBind[V4DPI_AreaBindInfo_Dim_Max] ;  /* List of dimensions in
                                                                  area with bind records */
} ;
Evaluator Functionality
struct kwlist
{   int value ; char entry[15] ; } ;
    struct kwlist comlist[ ] =  { { 1, "AREA" }, { 2, "BIND" }, {3, "CONTEXT"0 }, { 4,
                                "DIMENSION" },
                                { 5, "INCLUDE" }, { 6, "POINT" }, { 7, "=" }, { 8,
                                "BUCKET" }, { 9, "SET" },
                                { 10, "EXIT" }, { 11, "APPEND" }, { 12, "INSERT" }, { 13,
                                "{/" },
                                { 14, "DUMP" }, { 15, "EVALUATE" }, { 16, "IF" }, { 17,
                                "ELSE" }, { 18, "ENDIF" },
                                { 19, "ARGUMENTS" }, { 20, "ECHO" }, { 21, "ELSEIF" }, {
                                22, "ERROR" },
                                { 23, "IF1" }, {-1, " "} } ;
    struct kwlist dimlist[ ] =  { {0, ";"}, { 1, "ACCEPTOR" }, { 2, "BINDING" }, { 3,
                                "DISPLAYER" }, { 4, "MACRO" },
                                { 5, "MULTIPLE" },{ 6, "RANGE" }, { 8, "UNIQUE" }, { 9,
                                "VERIFY" },
                                { 10, "INTERNAL" }, { 11, "EXTERNAL" }, { 12, "DIMENSION"
                                },
                                { 13, "HEIRARCHY" }, { 14, "CATEGORY" }, { 15, "REVIEW" },
                                { 16, "AUTOCONTEXT" }, {-1, " "}
                                } ;
    struct kwlist dimrlist[ ] = { { V4DPI_DimInfo_RelHReview_Const, "CONSTANT" },
                                {V4DPI_DimInfo_RelHReview_Area, "AREA" },
                                { V4DPI_DimInfo_RelHReview_Bind, "BINDING" }, { -1, " "}
                                } ;
    struct kwlist arealist[ ]=  { { 1, "CREATE" }, { 2, "READ" }, { 3, "UPDATE" }, { 4,
                                "CLOSE" }, { 5, "CREATEIF" }, {-1, " "} } ;
    struct kwlist ahilist[ ]=   { { 0, ";"}, { 1, "HEIRARCHY"}, { 2, "EXTDICTUPD"}, { 3,
                                "INTDICTUPD" }, { 4,"BINDINGUPD" },
                                { 5, "PRIMARY" }, { 6, "SLAVE" }, { 7, "CATEGORIES" }, {
                                8, "NOEXTDICTUPD" },
                                { 9, "NOINTDICTUPD" }, 10, "NOBINDINGUPD" }, { 11,
                                "NEWMACRO" }, { 12, "BUCKETSIZE" }, {-1," "}
                                } ;
    struct kwlist ctxlist[ ]=   { { 1, "ADD" }, { 4, "EXAMINE" }, { 2, "POP" }, { 3,
                                "PUSH" }, {-1, " "} } ;
    struct kwlist setlist[ ] =  { {0, ";"}, { 1, "ECHO" }, { 2, "NOECHO" }, { 3, "RESULTS"
                                }, { 4, "NORESULTS" },
                                { 5, "TRACE"}, { 6, "NOTRACE" }, { 7, "MACROBIND" }, { 8,
                                "MACROCALL"}, { 9, "TEXTBIND"},
                                { 10, "PARAMETER"}, {-1, " "}
                                } ;
    struct kwlist iflist[ ]=    { { 1, "DEFINED" }, { 2, "EMPTY" }, { 3, "SAME" }, { 4,
                                "NUMERIC" },
                                { -1, " " }
                                } ;
struct kwlist pntlist[ ] = {
        { V4DPI_PntType_Char, "ALPHA" },
        { V4DPI_PntType_CmpndIsct, "COMPOUND" },
        { V4DPI_PntType_FrgnDataEl, "DATAEL" },
        { V4DPI_PntType_Dict, "DICTIONARY" },
        { V4DPI_PntType_Foreign, "FOREIGN" },
        { V4DPI_PntType_Int, "INTEGER" },
```

```
                { V4DPI_PntType_Isct, "INTERSECTION" },
                { V4DPI_PntType_IntMod, "INTMOD" },
                { V4DPI_PntType_PntIdx, "POINTINDEX" },
                { V4DPI_PntType_Shell, "SHELL" },
                { V4DPI_PntType_Special, "SPECIAL" },
                { V4DPI_PntType_FrgnStructE1, "STRUCTEL" },
                { V4DPI_PntType_V3Mod, "V3MOD"},
                { V4DPI_PntType_V3ModRaw, "V3MODRAW" },
                { V4DPI_PntType_Context, "CONTEXT" },
                { V4DPI_PntType_List, "LIST" },
                { V4DPI_PntType_Pragma, "PRAGMA" },
                { V4DPI_PntType_Me,Ptr, "MEMPTR" },
                { V4DPI_PntType_V3PicMod, "V3PICMOD" },
                { V4DPI_PntType_BigText, "BIGTEXT" },
                { V4DPI_PntType_PIntMod, "PINTMOD" },
                { V4DPI_PntType_Time, "TIME" },
                { V4DPI_PntType_Binding, "BINDING" },
                { V4DPI_PntType_Logical, "LOGICAL" },
                { -1, " "}
        };
/* v4eval_Eval - Evaluates a text string */
/* Call: xxx = v4eval_Eval( tcb , ctx , multeval , inittrace , initresult)
        where tcb is pointer to token control block (V4LEX_TknCtrlBLk)
            ctx is the current context,
            multeval is TRUE for multi-line evaluations, FALSE for single command,
            inittrace is initial trace setting,
            initresult is initial results setting
v4eval_Eval(tcb,ctx,multeval,inittrace,initresult)
        struct V4LEX_TknCtrlBlk *tcb ;
        struct V4C_Context *ctx ;
        int multeval,inittrace,initresult
...
eval_it: strcat(tbuf,"\r") ;   v4lex_InitTCB(&ttcb) ;
                                v4lex_NestInput(&ttcb,0,tbuf,V4LEX_InpMode_String)
                                    ;
            v4dpi_PointParse(ctx,&isctpt,&ttcb) ; v4eval_ChkEOL(&ttcb) ;
            if (v4dpi_IsctEval(&valpt,&isctpt,ctx,NULLP,FALSE,&aid,NULLP) == NULLP)
            v4_error(tcb,"V4","Eval","MACNOTDEF","No such macro currently defined: %s",cname) ;
/*          Set up key for this entry */
            bt = (struct V4LEX_BigText *)v4mm_AllocChunk(sizeof *bt,FALSE) ;
            bt->kp.fld.KeyType =    V4IS_KeyType_V4 ; bt->kp.fld.KeyMode =
                                    V4IS_KeyMode_Int ;
            bt->kp.fld.Bytes =      V4IS_IntKey_Bytes ; bt->kp.fld.AuxVal =
                                    V4IS_SubType_BigText ; bt->Key =
                                    valpt.Value.IntVal ;
            if (v4is_PositionKey(aid,bt,&btx,0,V4IS_PosDCKL) != V4RES_PosKey)
            v4_error(tcb,"V4","Eval","LOADMACFAIL","Could not load macro (%s) from
                                    V4 area (%d)",cname,aid) ;
            strcpy(mname,cname) ;                           /* Save name in case
                                                            we may reference again */
            v4is_GetData(aid,bt,sizeof *bt,0)               /* Copy into bt */
            if (gotfile)                                    /* If copying to file then do it */
            {   for(i=0;filename[i]!=0;i++) { filename[i] = tolower(filename[i]) ; }
                                ;
                if ((fp = fopen(v3_logical_decoder(filename,FALSE),(gotfile ==
                                    V_OpCode_Rangle ? "w" : "a"))) == NULLP)
                v4_error(tcb,"V4","Eval","FOPENERR","Could not write/append to file
                                    %s (%d)",filename,errno) ;
                fputs(bt->BigBuf,fp) ; fclose(fp) ;
            }   else                                        /* If expanding macro then blow into lexical */
            {   v4lex_NestInput(tcb,NULLP,bt->BigBuf,V4LEX_InpMode_String) ;
                tcb->ilvl[tcb->ilx].arglist = (char
                                    *)v4mm_AllocChunk(strlen(argbuf)+1) ;
                strcpy(tcb->ilvl[tcb->ilx].arglist,argbuf) ;    /* Copy argument list
                                    into level buffer */
            } ;
            break ;
            case 0: /* End of line (i.e. blank) */ continue ;
            case 13: /* Got "{/" - Create a new "macro" or text entry */
            if (bt != NULLP) { memset(bt,0,sizeof *bt) ; }
              else { bt = (struct V4LEX_BigText *)v4mm_AllocChunk(sizeof *bt,FALSE)
                                ; } ;                       /* Allocate temp buffer */
            v4lex_NextTkn(tcb,0) ;                          /* Get macro/entry name */
            strcpy(mname,tcb->keyword) ;                    /* Copy name and any extra stuff till end of line (below) */
/*          Parse rest of: {/macro [( argument name list)] "optional args" } < file
                                    */
            gotnest = FALSE ; v4lex_NextTkn(tcb,V4LEX_Option_RetEOL) ;
            argbuf[0] = 0                                   /* Zap parameter name list */
            if (tcb->opcode == V_OpCode_LParen)
```

```
    {   strcpy(argbuf,"Argument ") ;                              /* Set up dummy command to handle arguments */
        for (i=0;i<V4LEX_Tkn_ArgMax;i++)
        {   v4lex_NextTkn(tcb,0) ;
            if (tcb->type != V4LEX_TknType_Keyword)
            v4_error(tcb,"V4","Eval","INVMACARGNAME","Not a valid macro argument name") ;
            strcat (argbuf,tcb->keyword) ; strcat(argbuf," ") /*; Keep track of argument names */
            v4lex_NextTkn(tcb,0) ; if (tcb->opcode == V_OpCode_Comma) continue ;
            if (tcb->opcode == V_Opcode_RParen) break ;
            v4_error(tcb,"V4","Eval","INVMACARGTERM","Expecting comma or right
                        paren after argument name") ;
        } ; strcat(argbuf,";") ;
        v4lex_NextTkn(tcb,V4LEX_Option_RetEOL) ;
    } ;
    if (tcb->type == V4LEX_TknType_String)
    { strcpy(xdims,tcb->string) ; v4lex_NextTkn(tcb,V4LEX_Option_RetEOL) ;
                } else { xdims[0] = 0 ; } ;
    if (tcb->opcode == V_OpCode_RBrace)
    {   v4lex_NextTkn(tcb,V4LEX_Option_RetEOL) ;
        if (tcb->opcode != V_OpCode_Langle)
        v4_error(tcb,"V4","Eval","MISSINGLBRKT","Expecting \"<[|]P' after
                        closing brace in macro/text declaration") ;
        v4lex NextTkn(tcb,V4LEX_Option_RetEOL) ;
        if (tcb->type == V4LEX_TknType_Keyword)
        {   for(i=strlen(tcb->keyword)-1;i>=0;i--) { tcb->keyword[i] =
                        tolower(tcb->keyword[i]) ; } ;
            strcpy(tcb->string,tcb->keyword) ; strcat (tcb->string,".v4b") ;
        } ;
        if ((incfp = fopen(v3_logical_decoder(tcb->string,TRUE),"r")) == 0)
        v4_error(tcb,"V4","Eval","INVINCFILE","Could not access file to
                        INCLUDE %s (%d)",tcb->string,errno) ;
        gotnest = TRUE ; strcpy(tbuf,tcb->string) ;
    } ;
    v4eval_ChkEOL(tcb) ;                                          /* Verify EOL */
    if (gotnest) { v4lex_NestInput(tcb,incfp,tbuf,V4LEX_InpMode_File) ;
                        gotnest = tcb->ilx ; } ;
    tcb->need_input_line = TRUE ;                                 /* Force to new line */
    if (strlen(textbind) > 0)                                     /* Handle different depending on text/macro */
    {   for(mp=bt->BigBuf,*mp=NULLP,savemp=NULLP,nest=1;;)
        {   v4lex_ReadNextLine(tcb,1) ;
            if (gotnest) { if (gotnest != tcb->ilx) break ; }
            else  {   if (strncmp(tcb->ilvl[tcb->ilx].input_str,"}",1) == 0)
                            nest++
                        if (strncmp(tcb->ilvl[tcb->ilx].input_str,"!{",2) == 0)
                            nest++
                        if (strncmp(tcb->ilvl[tcb->ilx].input_str,"}",1) == 0)
                            nest-- ;
                        if (strncmp(tcb->ilvl[tcb->ilx].input_str,"!",2) == 0)
                            nest-- ;
                        if (nest <= 0) { tcb->need_input_line = TRUE ; break ; } ;
                } ;
            strcat(mp,tcb->ilvl[tcb->ilx].input_str) ; mp += strlen(tcb-
                        >ilvl[tcb->ilx].input_str) ;
        } ;  *mp = NULLP
    } else
    {   mp = bt->BigBuf
        if (strlen(argbuf) > 0) { strcpy(mp,argbuf) ; mp += strlen(argbuf) ; } ;
        *mp = 0 ;
        for (savemp=NULLP;;)
        (   v4lex_NextTkn(tcb,V4LEX_Option_ForceAsIs) ;
            if (gotnest) { if (gotnest != tcb->ilx) break ; }
            else { if (savemp != NULLP)                           /* Look for end of macro definition - 2 part process */
                        {   if (strcmp(tcb->string,mname) == 0)
                                { mp = savemp ; break ; } else { savemp = NULLP ; continue ; } ;
                        } ;
                        if (strcmp(tcb->string,"}/") == 0) savemp = mp ;   /* (second part) */
                } ;
            strcat(mp,tcb->string) ; strcat(mp," ") ; mp += (strlen(tcb->string)+1) ;
        } ; *(mp-1) = NULLP ;
    } ;
    bt->Bytes = (char *)mp - (char *)bt + 1 ;                     /* Get length of the entry */
    if (strlen(macrobind) == 0 && strlen(textbind) == 0) break ;  /* No "Set MacroBind"- then just save locally */
    strcpy(bindbuf,(strlen(macrobind) > 0 ? macrobind : textbind)) ;
    for (i=0,l=0;;i++)
    {   switch (bindbuf[i])
        {   case 0: tbuf[l] = 0 ; goto eval_it2 ;
            case '*': tbuf[l] = 0 ; strcat(tbuf,mname) ;
                        if (strlen(xdims) > 0) { strcat(tbuf," ") ;
                            strcat(tbuf,xdims) ; } ;
                        l = strlen(tbuf) ; break ;
```

-continued

```
                    default: tbuf[l++] = bindbuf[i] ; break ;
                  } ;
              } ;
eval_it2:     strcat(tbuf,"\r") ;    v4lex_InitTCB(&ttcb)
                            v4lex_NestInput (&ttcb,0,tbuf,V4LEX_InpMode_String)
                                      ;
              v4dpi_PointParse(ctx, &isctpt, &ttcb) ; v4dpi_PointParse(ctx,&valpt,&ttcb)
                                      ;
              v4eval_ChkEOL(&ttcb) ;                              /* Verify EOL */
              v4ctx_FrameAddDim(ctx,V4C_FrameId_Real,&valpt,0)    /* Add point to current context */
              v4dpi_BindListMake(&bindpt,&valpt,&isctpt,&nbl,ctx,&aid) ;
      /*      Set up key for this entry */
              bt->kp.fld.KeyType =    V4IS_KeyType_V4 ; bt->kp.fld.KeyMode =
                                      V4IS_KeyMode_Int ; bt->kp.fld.Bytes =
                                      V4IS_IntKey_Bytes ;
              bt->kp.fld.AuxVal = V4IS_SubType_BigText ; bt->Key = valpt.Value.IntVal ;
      /*      Now write it all out */
              v4is_Insert(aid,bt,bt,bt->Bytes,V41S_PCB_DataMode_Data,V4IS_DataCmp_None,0,
              FALSE,FALSE,0) ;
              if (results) printf("Wrote macro %s to area %d\n",mname,aid) ;
              break
              case 11:                                            /* APPEND [intersection] value */
              case 12:                                            /* INSERT [intersection] value */
              v4dpi_PointParse(ctx,&isctpt,tcb) ;
              v4dpi_PointParse(ctx,&valpt,tcb) ;
              if (valpt.Grouping == V4DPI_Grouping_Current)       /* Pull value
                                                                     from context? {CONTEXT} */
              {   if ((dpt = v4ctx_DimValue(ctx,valpt.Dim,FALSE)) == NULLP)
                    v4_error(tcb,"V4","AppIns","PTNOTINCTX","Could not find value point in current context") ;
                  memcpy (&valpt,dpt,dpt->Bytes) ;
              } ;
              v4eval_ChkEOL(tcb) ;                                /* Verify EOL */
              bind = (struct V4DPI_Binding
                            *)v4dpi_IsctEval(&point,&isctpt,ctx,NULLP,trace,&a
                            id,NULLP) ;
              if (bind == NULLP) v4_error(0,"V4","Append","NOAPNDINSPT","No point
                            found to APPEND/INSERT to") ;
              memcpy(&bindpt,bind,bind->Bytes) ;                  /* Copy binding into temp buffer */
              bind = &bindpt ;
              dpt = (struct V4DPI_Point *)&bind->Buffer ;         /* Get pointer to list point */
              isct = (Struct V4DPI_Point *)&bind->Buffer[bind->IsctIndex] ;
              memcpy(&isctpt,isct,isct->Bytes) ;                  /* Copy intersection into temp */
              lp = (struct V4L_ListPoint *)&dpt->Value ;          /* Link to list */
              v41_ListPoint_Modify(lp,(cx==11 ? V4L_ListAction_Append :
                            V4L_ListAction_Insert),&valpt) ;
              dpt->Bytes = ALIGN((char *)&dpt->Value.AlphaVal[lp->Bytes] - (char
                            *)dpt) ;
              bind->IsctIndex = ALIGN(dpt->Bytes) ;               /* Get new offset for trailing intersection */
              memcpy(&bind->Buffer[bind->IsctIndex],&isctpt,isctpt.Bytes) ; /* Put intersection back */
              bind->Bytes = (char *)&bind->Buffer[bind->IsctIndex+isctpt.Bytes) -
                            (char *)bind ;
              Rewrite the binding back from whence it came */
              v4is_Replace (aid,bind,bind,bind,bind-
                            >Bytes,V4IS_PCB_DataMode_Index,V4IS_DataCmp_None,0
                            ,0) ;
              if (results)
              { v4dpi_PointToString(&result,dpt,ctx,-1) ; printf("List =
                            %s\n",result) ; } ;
              break ;
              case 19:                                            /* ARGUMENTS namelist */
              b = 0 ;                                             /* Used to track if all start with same char */
              for(i=0;i<V4LEX_Tkn_ArgMax;i++)
              {    v4lex_NextTkn(tcb,V4LEX_Option_RetEOL) ;
                   if (tcb->type != V4LEX_TknType_Keyword) break ;
                   if (b == 0) { b = tcb->keyword[0] ; }
                   else { if (b != tcb->keyword[0]) b = TRUE ; };
                   strcpy(tcb->ilvl[tcb->ilx] .macarg[i].name,tcb->keyword) ; /* Just save in name list for this level */
              } ;
              tcb->ilvl[tcb->ilx].HaveMacroArgNames = b ;         /* Flag that we got names */
              break ;
              case 1:                                             /* AREA mode [fileame options] */
              memset(&pcb,0,sizeof pcb) ;
              strcpy(pcb.V3name,"testu") ; pcb.BktSize = 8192
              pcb.DataMode = V4IS_PCB_DataMode_Auto ; pcb.AccessMode = -1 ;
              pcb.DfltPutMode = V4IS_PCB_GP_Insert ; pcb.MinCmpBytes = 500 ;
                            pcb.DfltDataMode = 500;
              memset(&ahi,0,sizeof ahi) ; ahi.IsPrimary = TRUE ;
                            strcpy(ahi.BindCatList, "KERNEL") ;
              ahi.BindingsUpd = TRUE ; ahi.IntDictUpd = TRUE ; ahi.ExtDictUpd = TRUE ;
```

-continued

```
switch (v4eval_NextKeyWord(arealist,tcb))
{   default: v4_error(tcb,"V4","Eval","INVAREAACCKW","Invalid AREA access
            keyword: %s",tcb->keyword) ;
    case 1: /* CREATE */ pcb.OpenMode = V4IS_PCB_OM_New ;
            ahi.RelHNum = 5 ; break ;
    case 2: /* READ */ pcb.OpenMode = V4IS_PCB_OM_Read ;
            break ;
    case 3: /* UPDATE */ pcb.OpenMode = V4IS_PCB_OM_Update ;
            break ;
    case 4: /* CLOSE */ v4ctx_AreaClose(ctx,-1) ; goto
            end_area ;
    case 5: /* CREATEIF */ pcb.OpenMode = V4IS_PCB_OM_NewIf ;
            ahi.RelHNum = 5 ; break ;
} ;
```

EXAMPLES OF IMPLEMENTATION

Procedural Language (Data)

In using the method of the present invention to approximate the variable structures of conventional high-level programming languages, for example, one would establish dimensions and bindings as follows:

NId—a dimension for the names of things in the program.

Program—a dimension for points corresponding to each program in the system.

Proc—a dimension for points corresponding to each procedure declared in the programs.

Invoke—a dimension for points corresponding to each procedure invocation (created as the program executed).

The variables in the programs may then be thought of as the following bindings:

global heap [NId=var , Program=name]

local dynamic [NId=var , Proc=procedure , Invoke=frame]

local heap [NId=var, Proc=procedure]

In such a structure, if Program, Proc, and Invoke are established as part of the context C, then each type of variable may be referenced simply with NId points (that is, the variable name), in the same manner as in conventional programming. Maintenance of the context may be performed independently of the program (in a manner analogous to the operation of the internal code generated by compilers for managing frame, heap, stack and other memory control structures.)

Database Definition Example

DataEl=(5109,1, CHECK_NUMBER,APO_CHECK_NUMBER,1,0,1,0,4,0)
Bind [Field=CHECK_DATE FileRef=5109 DataEl]
DataEl=(5109,2, CHECK_DATE,EXEC_KO_DATE,1,0,1,4,4,0)
Bind [Field=CASH_ACCOUNT FileRef=5109 DataEl]
DataEl=(5109,3, CASH_ACCOUNT,APO_CASH_ACCOUNT,15,0,1,8,2,0)
Bind [Field=TTL_CHECK_AMT FileRef=5109 DataEl]
DataEl=(5109,4, TTL_CHECK_AMT,EXEC_KO_MONEY,1,0,1,12,4,2)
Bind [Field=TTL_DISCOUNT_AMT FileRef=5109 DataEl]
DataEl=(5109,5, TTL_DISCOUNT_AMT,EXEC_KO_MONEY,1,0,1,16,4,2)
Bind [Field=TTL_APPLY_AMT FileRef=5109 DataEl]
DataEl=(5109,6, TTL_APPLY_AMT,EXEC_KO_MONEY,1,0,1,20,4,2)
Bind (Field=SORT1 FileRef=5109 DataEl)
DataEl=(5109,7, SORT1, EXEC_KO_ALPHA,3,0,1,24,10,0)
Bind [Field=NAME FileRef=5109 DataEl] DataEl=(5109,8, NAME,EXEC_KO_ALPHA,3,0,1,34,30,0)
Bind [Field=ADDRESS1 FileRef=5109 DataEl]
DataEl=(5109,9, ADDRESS1, EXEC_KO_ALPHA,3,0,1,64,30,0)
Bind [Field=ADDRESS2 FileRef=5109 DataEl]
DataEl=(5109,10, ADDRESS2, EXEC_KO_ALPHA,3,0,1,94,30,0)
Bind [Field=CITY FileRef=5109 DataEl]
DataEl=(5109,11, CITY,EXEC_KO_ALPHA,3,0,1,124,30,0)
Bind [Field=ADDRESS3 FileRef=5109 DataEl]
DataEl=(5109,12, ADDRESS3, EXEC_KO_ALPHA,3,0,1,154,30,0)
Bind [Field=ADDRESS4 FileRef=5109 DataEl]
DataEl=(5109,13, ADDRESS4, EXEC_KO_ALPHA,3,0,1,184,30,0)
Bind [Field=ZIP FileRef=5109 DataEl] DataEl=(5109,14, ZIP,APO_GEN_UZIP,1,0,1,216,4,0)
Bind [Field=ZIPXTRA FileRef=5109 DataEl]
DataEl=(5109,15, ZIPXTRA,EXEC_KO_ZIPXTRA,3,0,1,220,16,0)
Bind [Field=STATE FileRef=5109 DataEl]
DataEl=(5109,16, STATE,EXEC_KO_UCALPHA,3,0,1,236,2,0)
Bind [Field=COUNT FileRef=5109 DataEl]
DataEl=(5109,17, COUNT,EXEC_KO_INTEGER,15,0,1,238,2,0)
Bind [Field=SEL_INDEX FileRef=5109 DataEl]
DataEl=(5109,18, SEL_INDEX,EXEC_KO_INTEGER,15,0,2,0,2,0)
Bind [Field=APOPNITM_ID FileRef=5109 DataEl]
DataEl=(5109,19, APOPNITM_ID,APO_APOPNITM_ID,1,0,2,4,4,0)
Bind [Field=VENDOR_INVOICE FileRef=5109 DataEl]
DataEl=(5109,20, VENDOR_INVOICE,APO_VENDOR_INVOICE,3,0,2,8,15,0)
Bind [Field=VENDOR_INV_DATE FileRef=5109 DataEl]
DataEl=(5109,21, VENDOR_INV_DATE,EXEC_KO_DATE,1,0,2,24,4,0)
Bind [Field=COMMENTS FileRef=5109 DataEl]
DataEl=(5109,22, COMMENTS,EXEC_KO_ALPHA,3,0,2,28,30,0)
Bind [Field=CHECK_AMT FileRef=5109 DataEl]
DataEl=(5109,23, CHECK_AMT,EXEC_KO_MONEY,1,0,2,60,4,2)
Bind [Field=DISCOUNT_AMT FileRef=5109 DataEl]

DataEl=(5109,24, DISCOUNT_AMT,EXEC_KO_MONEY,1,0,2,64,4,2)
Bind [Field=APPLY_AMT FileRef=5109 DataEl]
DataEl=(5109,25, APPLY_AMT,EXEC_KO_MONEY,1,0,2,68,4,2)
Bind [Field=ALL FileRef=5109 DataEl] DataEl=(5109,26, ALL,EXEC_KO_ALPHA,3,0,2,0,72,0)
Bind [Field=ITEM FileRef=5109 DataEl] DataEl=(5109,27, ITEM,STRUCT1,3,0,1,240,25200,2)
Bind [FileRef=5109 Structure=2] StructEl=(5109,2,27,72, 350,240)
Bind [Field=DEF_AP_CHECK_PRINT FileRef=5109 DataEl]
DataEl=(5109,28, DEF_AP_CHECK_PRINT, STRUCT0,3,0,0,0,25440,2)
Bind [FileRef=5109 Structure=1] StructEl=(5109,1,28, 25440,0,0)
Bind [Field=VENDOR_REF FileRef=5110 DataEl]

Procedural Language (Flow of Control)

In addition to the above data structures, flow of program control requires the following dimensions and bindings:

Level—a dimension for the nested level of Begin/End constructs.
Step—a dimension for the program statements in each procedure.
Label—a dimension for arbitrary labels
Bindings to provide flow are thus:
[Proc, Level, Step, NId=NextStep]=step
Goto: [Proc, Level, Step, NId=NextStep]=step
while a conditional branch evaluates to a Level and inserts this Level into the Context Set, CS.

Procedure entry and exit is similarly a manipulation of the Context such that on entry to a procedure, the Proc, Frame, Level, and Step are placed in CS, while the old CS is placed into a new CS. Return from a procedure is simply then, the restoration of the old CS.

Example of a Recursive Function (Within Evaluator)

Set Echo
Bind [Factorial Int:{all}] Mult(Int:{Binding} [Factorial|Minus(Int:{Binding} Int:1)])
Bind [Factorial Int:1] Int:1
=[Factorial Int:5]
  INT(12):120

Object Oriented Program Example

Dim Host Dict
Dim OpMode Dict Bind 5
Dim Method Dict Bind 5
Dim Keyword Dict Bind 5
Bind [DCL DataType:NewAddress] Alpha:"Alpha:50"
Bind [DataType DataType:newAddress] DataType:AdrField
Bind [Host:DecAlpha DCL DataType:UDate] Alpha:"int64"
! Set up "Inheritance"
Bind [OpMode=OOPS NId={All} DataType:{All}] [NId={Binding}[DataType DataType:{Binding}]]
Bind [OpMode=OOPS NId={All} Keyword:{All}] [NId={Binding} [DataType Keyword:{Binding}]]
! Set Up "Polymorphism"
Bind [Method=Format Keyword={All}] [Displayer Keyword={Binding}]
Context Push OOPS
Context Add OpMode=OOPS
! mDefine Two "Instances"
Bind [Keyword=MinDays Desc] Alpha="Minimum Days to Age"
Bind [Keyword=MinDays DataType] DataType:Integer
Bind [Keyword=MinDays Desc] Alpha="Date of Aging"
Bind [Keyword=MinDays DataType] DataType:UDate
! Manipulate Objects
=[Method=Format Keyword=MinDays]
  V3MODULE(16):ITX_NUM
=[Method=Format Keyword=AgeDate]
  V#MODULE(20):ITX_DATE
={Dcl Keyword=AgeDate}
  ALPHA(12):INT
Context Add Host:DecAlpha
=[Dcl Keyword=AgeDate]
  ALPHA(16):"int64"
Context Pop

Time-based System Example

Dim Time Time
Dim Tran Time Unique
Dim B Binding
Bind [freddy time={now}] alpha="now is the time"
Bind [TranID Tran={New}] int=123
Bind [TranId Tran={New}] int=2345
Bind [TranID Tran={New}] alpha-"ho ho ho"
=[TranId]
  ALPHA(20):"ho ho ho"
=[freddy]
  ALPHA(24):"now is the time"
Eval Remove_Point(B={LastBind})
=[TranId]
  INT(12):2345
Bind [TranId Tran={New}] alpha="the next one"
=[TranId]
  ALPHA(24):"the next one"
Bind [Next Int={All}] [IntMod=Next_IsctVal Int={Binding}]
Bind [Describe Iter=[Next Int={Binding}],[IntMod=Echo Iter={Context}]]
  [IntMod=MakeSeq_IsctVal@[TranId] Int=1 Int=2 Int=3]
Eval [Describe]
  2345
  123

Reference: Operators for Manipulation of Data and Structures

--- itx_Point - Converting from V4 Point to Text
Syntax
    itx_point(point, buffer, flags)
point        a v4 point (V4Point)
buffer      the text string/buffer to be updated (alpha)
flags       any combination of standard itx flags (int)
Description
    This module is used to convert a point from its internal representation (as a pointer) to a printable format.
Example
    dcl v4point pt,*res;
    loop
    {xti_Point(tty_Get('Eval?'),pt,0);res := v4_EvalPoint(pt);
     if sys_address(res) then
     {itx_Point(res;buf;0);p'The result is',buf;};
    };
/undefined_module/ - Auto-Loading Undefined Module
Syntax
    v3_Set_Parameter(/undefined_module/, string)
string      a V4 intersection to be evaluated whenever an undefined module is referenced. The string may contain one or more asterisks which are replaced with the actual module to be defined. (alpha)
Description
    This format of the "v3_Set_Parameter" module is used to define a V4 intersection "mask" which is to be expanded and evaluated whenever an undefined V3 module is referenced.
Example
    The example below causes V4 to substitute in the undefined module where the asterisk is, evaluate the resulting intersection and load the resulting module reference.
    v3_Set_Parameter(/undefined_module/,"[* Dim:Macro]");
v4_AreaClose - Closing a V4 Area
Syntax
    v4_AreaClose(areaid)
areaid     the numeric area id to be closed (int)
Description
    The "v4_AreaClose" module is used to close a V4 area that has been previously opened with the call "v4_AreaOpen". The area is closed and all references to the area are removed from the current context.
    Note that all areas are closed upon V3/V4 exit.
Example
    id := v4_AreaOpen('clientstuff',nil);
    . . .
    v4_AreaClose(id);
v4_AreaOpen - Opening a V4 Area
Syntax
    areaid = v4_AreaOpen(filename, nil)
filename    the name of the file to be opened as a V4 area (string)
nil         "nil" indicates a default open to read-only (nil)
    The form above opens an existing V4 area for read-only access. The form below is a more generalized version and may be used to open existing areas for read/update and also to create new areas.
    areaid = v4_AreaOpen(filename, ahibuf)
filename    the name of the file to be opened as a V4 area (string)
ahibuf     a reference to the structure v4_ahi which contains information on the definition of an area. (V4C_AreaHInfo)
    The format below is the most general form:
    areaid = v4_AreaOpen(pcbbuf, ahibuf)
pcbbuf     a reference to a v4_pcb structure which contains detailed information for declaring a new area file. (V4IS_ParControlBlk)
ahibuf     a reference to the structure v4_ahi which contains information on the definition of an area. (V4C_AreaHInfo)
Description
    The module, "v4_AreaOpen" is used to open a new or existing V4 area for access by the V4 multi-dimensional database. Several different modes of the call are available:
Example
    v4_AreaOpen('v3_syslib:v4kernel',nil);    /* Open V4 kernel, read only */
v4_BigBufGet/v4_BigBufPut - Reading and Writing "Big Buffers"

-continued

```
Syntax
    bytes = v4_BigBufGet(bufid, dstbuf)
bytes       this module returns the number of bytes in
            the big buffer (int)
bufid       the buffer identifier/key (int)
dstbuf      the v3 string buffer to be updated with the
            "big buffer" (V4LEX_BigText)
    writing a "big buffer" is done with the following module:
    aid = v4_BigBufPut(bufid, srcbuf)
aid         the area identifier indicating which area the
            "big buffer" was put into. (int)
bufid       the buffer id to store (int)
srcbuf      the v3 buffer to be stored. (V4LEX_BigText)
Description
    A "big buffer" is an entry within a V4 area which contains one or more lines of text or
    any other data.
Example
    dcl struct V4LEX_BigText bt;
    dcl sr text,sa;
    v4_AreaOpen("v3lib",nil);
    v4_BigBufGet("[V3_IOUNIT Dim:Macro]"),bt);
    loop(text==bt.bigbuf;str_len(text);)
    {sa == str_break('\n',text); p sa;};
v4_BindPoint - Returns the V4 Point Corresponding to the Last Binding
Syntax
    point = v4_BindPoint(dimid)
point       the point corresponding to the last binding
            (v4point)
dimid       a dimension of type Bind to be used for the
            returned point (v4point)
Description
    This module returns the point corresponding to the last binding made within the
    current V4 environment.
Example
    v4_Bind(point,value);
    bpoint := v4_BindPoint(v4_DimId('Binding'));
v4_Bind - Binding an Intersection to a Value
Syntax
    aid = v4_Bind(intersection, value)
aid             the area id where the binding was stored (int)
intersection    may be either a V4 point corresponding to an
                intersection or a text string in the format of a
                valid V4 intersection. (v4point/string)
value           may be either a V4 point or a text string in
                the format of a valid V4 point.
                (v4point/string)
Description
    The "v4_Bind" module is used to bind points in an intersection to a value point. The
    format of the call is:
Example
    dcl v4point *isct,*val;
    xti_Point(tty_Get('Enter Isct?'),isct,0);
    xti_Point(tty_Get('and value?'),val,0);
    v4_Bind(isct,val);
v4_Close - Closing a V4IS Area
Syntax
    v4_Close(pcb)
pcb         the V4IS area's parameter control block.
            (V4IS_ParControlBlk)
Description
    Closes the V4IS area specified in the pcb.
Example
    pcb.FileName := 'important.dat';
    pcb.OpenMode := xxx
    v4_Open(pcb);
    . . .
    v4_Close(pcb);
v4_ContextAdd - Adding a Point to the Context
    Adding a new point or replacing a point for a dimension already in the context is done
    with:
Syntax
        v4_ContextAdd(frameid, point))
frameid     the id of the frame to which the point is to be
            added (use 0 for the current frame). (int)
point       may be a V4 point or a text string
            representing a point. (v4point/string)
Description
    Adds the specified point to the current context for the specified frame. In most cases,
    the point is to be added to the current frame which is referenced via frameid 0. If a
```

-continued point already exists in the context with the same dimension then it is replaced by the
new point.
Example
    v4_ContextAdd(0,'Client:ABC');
    xti_Point('Vendor:1233',pt,0);
    v4_ContextAdd(0,pt);
v4_ContextPop - Popping of a Context Frame
Syntax
    v4_ContextPop(framenum)
framenum    the framenumber to be popped off. Note that
    all frames pushed after this framenumber will
    also be popped. (int)
Description
    This module pops off one or more frames from the current context. If framenum is
    given and nonzero then all frames up to the specified frame are popped.
Example
    framenum := v4_ContextPush('Level12');
    ...
    v4_ContexPop(framenum);
v4_ContextPush - Pushing a new Context Frame
Syntax
    frameid = v4_ContextPush(framename)
frameid    the unique frame number generated for this
    context push. (int)
framename    a text string naming this frame. Frame names
    do not necessarily have to be unique. (string)
Description
    This module pushes a new frame with a name of framename onto the current V4
    context. The frameid is returned and may be used in subsequent context calls.
Example
    framenum := v4_ContextPush(str_concat(Level),lvl+=1);
v4_DataElVal - Extracting a Value from a Buffer
Syntax
    value = v4_DataELVal(buffer, des/despt)
value    the resulting V3 value extracted from buffer
buffer    usually a record buffer containing multiple
    fields (alpha)
des    a data element descriptor or point (v4point)
Description
    This module is used to extract a value (i.e. field) from a buffer based on the field's
    data element structure.
v4_DimGet - Obtaining the Dimension ID
Syntax
    dimid = v4_DimGet(dimname)
    dimid = v4_DimGet(point)
dimid    the dimension's numeric id (int)
dimname    the text name of the dimension (string)
point    the dimension id corresponding to any V4
    point can also be obtained. (v4point)
Description
    This module returns the dimension id associated with a dimension name or returns
    the dimension id for a specific point.
Example
    xti_Point(tty_get("Enter Point?"),point,0);
    dimid := v4_DimGet(point);
v4_DimMake - Creating a New Dimension
Syntax
    dimid = v4_DimMake(diminfo)
dimid    the new dimension's unique numeric identifier
    (int)
diminfo    the structure which defines the new
    dimension. (V4DPI_DimInfo)
Description
    New dimensions can be created with this call. The argument, diminfo, must be
    properly set or all sorts of ugly errors can occur.
Example
    del struct V4DPI_DimInfo di;
    di.DimName := 'Customer';di.PointType := #V4DPI_PntType_Integer;
    di.UniqueOK := /true/;
    v4_DimMake(di);
v4_Eval & v4_EvalPoint - Evaluating an Intersection
Syntax
    logical = v4_Eval(updateval, isctpt/string)
logical    (int)
updateeval
isct    (v4point/string)
    The second call is more general and simply returns a V4 point corresponding the
    value of the intersection:
    valpt = v4_EvalPoint(isctpt/string)

-continued

```
valpt       the value of the evaluated intersection
            (v4point)
isctpt      an intersection or string to be converted to an
            intersection (v4point/string)
Description
    The evaluation of an intersection can be done through one of two calls. The first call
    is the more convenient form in that it updates a V3 variable with the result
    (performing the necessary conversions from V4 to V3:
v4_Get - Getting a V4IS Record
    The module, "v4_Get" is used to read a record from a V4IS area:
Syntax
    v4_Get(pcb)
pcb     the area's parameter control block
        (V4IS_ParControlBlk)
Description
    Gets a record from the specified area.
Example
    pcb.DfltGetBuf == iobuf; pcb.DfltGetMode := V4IS_PCB_GP_Next;
    v4_Get(pcb);/* Read "next" record */
v4_IsctMake - Making an intersection
Syntax
    point = v4_IsctMake(src, appndpt)
point       the point corresponding to the intersection
            (v4point)
src         the base intersection to be appended to or nil
            to start a new intersection (V4point/nil)
appndpt     the point to be appended (v4point)
Description
    V4 intersections can be built up, point by point, with this module. To create a new
    intersection, first call with src equal to nil. To add points to the intersection, call the
    module with the point returned on the first call.
Example
    isct := v4_IsctMake(nil,pt1);      /* Create new isct */
    v4_IsctMake(isct,pt2);             /* Append second point */
v4_Open - Opening a V4IS Area
Syntax
    v4_Open(pcb)
pcb         the area parameter control block
            (V4IS_ParControlBlk)
Description
    V4IS areas are created or opened for input/output with this call. See the definition of
    the parameter control block at the end of this manual for more information.
v4_PointCopy - Copying a V4 Point
Syntax
    v4_PointCopy(dstpoint, srcpoint)
dstpoint    the point to be updated (v4point)
srcpoint    the point to be copied (v4point)
Description
    This module copies a point. Its main use is for copying points returned by many of the
    v4_xxx modules. These points have a limited lifetime and if a point is needed for an
    extended period of time then it should be copied into a more permanent home.
    Note that if dstpoint is an uninitialized pointer then space will be allocated and
    assigned to it before the copy.
v4_PointMake - Making a V4 Point
Syntax
    point = v4_PointMake(src, dimnum, value [,endvalue])
point       a reference to the resulting point (v4point)
src         nil to create a new point, or an existing point
            to be updated with a new value/range
            (v4point/nil)
dimnum      the dimension id for this point (int)
value       the value for this point or . . . (int/string)
endvalue    if endvalue is specified the value becomes
            "value . . . endvalue" (int/string)
Description
    This module is used to create a point with a single value or multiple value through
    multiple calls to the module.
Example
    newpt := v4_PointMake(nil,v4_DimId('Months'),9301,9302);
    v4_PointMake(newpt,nil,9305);
    v4_PointMake(newpt,nil,9307,9312);
    itx_Point(newpt,buf,0);
    p buf;
    Months:9301 . . . 9302,9305,9307 . . . 9312
v4_PointRemove - Removing a Point from an Area
Syntax
    v4_PointRemove(point)
point       the point to be removed (v4point)
Description
```

-continued

This module attempts to remove the specified point for the current V4 runtime environment. Currently only one type of point can be removed - a binding point.

Example
```
v4_Bind(isct,value);
bindpt := v4_BindPoint(xxx);
    . . .
v4_PointRemove(bindpt); /* Remove the binding point */
``` v4_Put - Writing a V4IS Record

Syntax
```
v4_Put(pcb)
```
pcb      the parameter control block for the area.
        (V4IS_ParControlBlk)

Description
    Inserts, replaces or deletes a record based on parameters specified in the pcb.

Example
```
pcb.PutBuf == iobuf; pcb.PutMode := _V4IS_PCB_GP_Keyed;
v4_Put(pcb);
``` v4_ScanForDim - Scanning Areas for a Pattern

Syntax
```
handle = v4_ScanForDim(handle, dimid, filterisct, isct, val, misct, xisctp)
```
| | |
|---|---|
| handle | the dimension's numeric id (int) |
| dimid | the text name of the dimension (int) |
| filterisct | an intersection to act as a filter. Only intersections containing all of the points in this point will be matched. (v4point) |
| isct | this is updated with the intersection for the current match (v4point) |
| val | this is updated with the value of the current match (v4point) |
| misct | if given, this is updated with the points in isct which were matched filterisct (v4point) |
| xisctp | if given, this is updated with the points in isct which were not matched. (v4point) |

Description
    The module below is used to scan all open areas in the current context for bindings containing a particular dimension:

v4_SetTrace - Controlling the "trace" Facility

Syntax
```
oldset = v4_SetTrace(newset)
```
| | |
|---|---|
| oldset | the trace setting prior to this call (int) |
| newset | the new trace setting. See below for values. (int) |

Description
    Sets the V4 tracing facilities based on the argument. The trace can be enabled in a variety of modes as described in the table below Example
```
oldsetting := v4_SetTrace(/true/);
``` v4_ValueGet - Updating a V3 Value with a V4 Point Value

Syntax
```
logical = v4_ValueGet(u3dst, point)
```
| | |
|---|---|
| logical | True if the module succeeds, False otherwise. (int) |
| v3dst | any V3 variable |
| point | a point to have value extracted. (v4point) |

Description
    This module is used to extract the "value" portion of a point, convert it to V3 format and update the u3dst with the value.

xti_Point - Converting a V3 String to a V4 Point

Syntax
```
xti_point(buffer, point, flags)
```
| | |
|---|---|
| buffer | a text buffer describing the point (string) |
| point | a V3 variable declared as either a pointer or V4 point. (v4point) |
| flags | (int) |

Description
    Converts the text buffer to a V4 point. The second argument must be declared as either a pointer or a V4 point. If given as an unitialized pointer (i.e. sys_address is 0) then memory will be automatically allocated for the point.

mod_Unload - Unloading a V3 Module from the Current Runtime Environment

Syntax
```
mod_Unload(modulen)
```
module     the name of the V3 module to be unloaded
            (string)

Description
    Unloads the module specified from the current V3 environment. The module must have been previously loaded as a stand-alone PIC module (i.e. not as part of a package).

-continued

Example
    mod_Unload('exec_sec_login');

The V4 Interpreter

Macros

The V4 interpreter has sophisticated macro definition and expansion capabilities. Macros can be locally defined and used, or stored within a V4 area for use in later environments. The primary purpose of a V4 macro is to provide a clean, easy-to-use method for defining a concept as multiple bindings.

For example, referencing a data file (V4IS) through V4 requires several bindings to define the area name, the key(s) to the area, how substructures are to be defined, etc. These could be done explicitly as shown below for accessing a vendor database Bind [Filename FileRef=9999] Alpha=" . . . /nsd/apvenmas.dat"
Bind [Buffer FileRef=9999 VendorPCB={All}]
    VendorPCB={Binding}
Bind [Buffer FileRef=9999]
    Open_V4IS([FileName FileRef=9999] [FileRef=9999 Structure=1] VendorPCB=0)
Bind [Record FileRef=9999 Vendor_Ref={All}]
    Get_V4IS([Buffer FileRef=9999] [DataEl FileRef=9999 [FileRef=9999 Key=1 Part=1]]
    Vendor_Ref={Binding} RecPtr=0)
Bind [Record FileRef=9999 Vendor_Id={All}]
    Get_V4IS([Buffer FileRef=9999] [DataEl FileRef=9999 [FileRef=9999 Key=2 Part=1]] Vendor_Id={Binding} RecPtr=0)
Bind [Value Field={All} Vendor_Ref={All}]
    Field_V4IS([Record FileRef=9999 Vendor_Ref={Binding}]
    [DataEl FileRef=9999 Field={Binding}])
Bind [Value Field=(All) Vendor_Id={All}]
    Field_V4IS([Record FileRef=9999 Vendor_Id={Binding}]
    [DataEl FileRef=9999 Field={Binding}])
Bind [Value Field={All} Vendor_Ref={All} Month={All}]
    S1bcField_V4IS([Record FileRef=9999 Vendor_Ref={Binding}]
    [DataEl FileRef=9999 Field={Binding}] [DataEl FileRef=9999 Field=Purch_Month] Month={Binding})
Bind [Value Field={All} Vendor_Ref={All} Index={All}]
    S1bxField_V4IS([Record FileRef=9999 Vendor_Ref={Binding}]
    [DataEl FileRef=9999 Field={Binding}] Index={Binding})
and repeated for every data base to be access. Or, a macro could be defined once and then invoked for each database
{/ADCL(aFileRef, aFileName, aRefField, aIdField, aRepeatField, aRepeatIndex)
Bind [Buffer FileRef:aFileRef AreaPCB={All}] AreaPCB={Binding};
Bind [Buffer FileRef:aFileRef]
    Open_V4IS(aFileName [FileRef:aFileRef Structure:1] AreaPCB:0);
Bind [Record FileRef:aFileRef aRefField:{All}]
    Get_V4IS([Buffer FileRef:aFileRef]
    [DataEl FileRef:aFileRef [FileRef:aFileRef Key:1 Part:1]] aRefField* RecPtr:0);
Bind [Value Field:{All} aRefField:{All}]
    Field_V4IS([Record FileRef:aFileRef aRefField*]
    [DataEl FileRef:aFileRef Field*])
;
if defined aIdField;
Bind [Record FileRef:aFileRef aIdField:{All}]
    Get_V4IS([Buffer FileRef:aFileRef]
    [DataEl FileRef:aFileRef [FileRef:aFileRef Key:2 Part:1]] aIdField* RecPtr:0);
Bind [Value Field:{All} aIdField:{All}]
    Field_V4IS([Record FileRef:aFileRef aIdField*]
    [DataEl FileRef:aFileRef Field*]);
end;
if defined aRepeatField;
    Bind [Value Field:{All} aRefField:{All} ARepeatField:{All}]
    S1bcField_V4IS([Record FileRef:aFileRef aRefField*]
        [DataEl FileRef:aFileRef Field*]
        [DataEl FileRef:aFileRef Field:aRepeatField] aRepeatField*);
end;
if defined aRepeatIndex;
    Bind [Value Field:{All} aRefField:{All} aRepeatIndex:{All}]
    S1bxField_V4IS([Record FileRef:aFileRef aRefField*]
        [DataEl FileRef:aFileRef Field*] aRepeatIndex*);
end;
}/ADCL
ADCL(5203, "v3_sapsdat:apvenmas.dat", vendor_ref, IdField=vendor_id, RepeatIndex=Line)

Note that defining additional areas only requires a single additional line in which all necessary parameters are easily defined.

Defining a Macro

A macro definition consists of a macro definition line, a body, and a macro trailer line. The macro header line declares the macro name and any parameters which may be referenced throughout the macro body. The body consists of any number of V4 interpretive commands plus several special commands which are only available within macros. The trailer is a line indicating the end of the macro.

Macro Header Lines

The format of a macro header line is

{/macroname (param1, param2, . . . paramn)

where macroname is the name of the macro, param1, . . . paramn, are the names of the parameters which may be referenced within the macro. It is desirable to preface each parameter with a single letter prefix, normally the letter "a". If all parameters are prefaced with the same letter then macro invocations can reference the parameters with or without the single letter prefix.

Macro Body Lines

The body of a macro is simply a list of V4 commands. In addition to the commands which actually do something are several commands for conditional execution such as "If" and "If1". All commands in the macro body must be ended with a semicolon!

Macro Trailer Line

The macro trailer line ends the macro. The format is

}/macroname where macroname must match the name in the header line.

Macro Invocation

A macro is invoked using a syntax similar to that of a procedure call macroname(arg1, arg2, . . . )

macroname(paramname=arg, paramname=arg, . . . )

As shown above, two formats are possible. The first format simply lists the argument in the order in which they are defined in the macro header line. The second form permits the specification of parameter values by parameter name (with or without the single letter prefix). It is possible to mix and match the two formats. Arguments not explicitly assigned to a parameter are assigned to the "next" parameter. In practice it is a good idea to define macros with all mandatory arguments before optional arguments. Then in an invocation, the mandatory arguments can be given without parameter names and any optional arguments can be listed with names.

Using Macros in a V4 Area

See the Set MacroBind command for more information on saving macros in a V4 area and the Set MacroCall command for an explanation on how to reference them.

Extracting the Contents of a Macro

It is possible to extract the contents of a macro with the following macroname( )>file macroname( )>>file The first form copies the contents of the macro to the file. The second form appends the contents to the file.

Commands

Area—Opening/Creating a V4 Area

Syntax

Area Read filename filename . . .

Area mode filename options

| mode | how the area is to be opened, Create to create a new area, Read to read an existing area, Update to read and/or update an existing area, CreateIf to create an area if it does not already exist, and Close to close an area. |
|---|---|
| filename | the name of the area |
| options | a list of options when creating a new area |

Description

The Area command creates, opens, and closes area in a V4 environment. One or more areas can be open for reading with a single command. The V4 kernel area should always be the first area opened and can be references as filename "v4kernel". A variety of options are available when creating a new area. These a summarized in the table below

| Hierarchy number | Assigns the area to a hierarchy. This is a number from 1 to 7. The V4 kernel is always number 1. |
|---|---|
| ExtDictUpd | Allow external dictionary updates. |
| IntDictUpd | Allow internal dictionary updates. |
| BindingUpd | Allow binding updates. |
| Primary | A primary area |
| Slave | A slave area. |
| Categories list | Categories are as listed |
| NoExtDictUpd | Do not permit external dictionary updates |
| NoIntDictUpd | Do not permit internal dictionary updates |
| NoBindingUpd | Do not permit bindings |
| NewMacro macroname | Specifies a macro to be invoked whenever the area is created (for use with the CreateIf mode). |
| BucketSize bytes | Specifies the bucket size of the area. The total number of bindings permitted to a binding point is indirectly related to the bucket size. In most cases the default bucket size should be acceptable. |

Example

Area Read v4kernel

Area Create Demo Hierarchy 5 Primary

Dimension—Declaring a New Dimension

Syntax

Dimension name type attributes

| name | the name of the dimension |
|---|---|
| type | the dimension type or how the dimension is to be used |
| attributes | a list of optional attributes |

This command is used to define new dimensions in an area. A dimension type must be one of the type from the table below (a detailed description of each type follows)

| Alpha | A character string |
|---|---|
| BigText | A large, multi-line chunk of text |
| Binding | A V4 Binding |
| Compound | A compound intersection used in iterations |
| Context | A context point, expanded into components upon evaluation |
| DataEl | A data element specification (the offset, length, datatype, etc.) |
| Dictionary | A dictionary point-stored as a number, displayed as a keyword |
| Foreign | A foreign data structure |
| Integer | An integer number |
| Intersection | An intersection |
| IntMod | An internal module |
| List | A list of values |
| Logical | A logical (true/false) value |
| MemPtr | A memory pointer |
| PIntMod | A partial internal module |
| PointIndex | A number representing a V4-allocated datastructure |
| Pragma | A pragmatic point (usually invisible) |
| Shell | A shell point, values are other points |
| Special | Points specified with the "{xxx}" construct |
| StructEL | A structure specification |
| Time | A time or transaction point |
| V3Mod | A link to a V3 module |
| V3PicMod | A link to the PIC definition of a V3 module |
| V3ModRaw | A link to a V3 module |

Attributes may be also specified to further refine the declaration. These are summarized below

| Acceptor module | Defines a V3 acceptor module for the dimension. |
|---|---|
| AutoContext point | Defines a V4 point to be used in auto-context look-ups. See below for more information on this feature |
| Binding num | Assigns a binding weight number to this dimension. See below for more information. |
| Displayer module | Defines a V3 displayer module for this dimension |
| Macro string | Declares a macro string to be used when creating points. Not currently used. |
| Multiple logical | Allows multiple values to be specified as a single point (ex: dim:a,b,c) |

| | -continued |
|---|---|
| Range logical | Allows a range of values to be specified as a single point (ex: dim:a . . . b) |
| Unique | Allows the user to create new points on this dimension with the (new) construct. |
| Verify | Not currently used |
| Internal | Who knows |
| External | Opposite of Internal |
| Dimension | Who knows |
| Heirarchy n | Specifies the Heirarchy for this dimension |
| Category xxx | Not currently used |
| Review how | Not currently used |

Auto-Context

The AutoContext attribute can be used to indirectly specify how a point is to be "valued" during the evaluation of an intersection if that point is not currently defined in the context.

For example, if the Customer dimension has been defined as
Dimension Customer Integer AutoContext NId:NeedCustomer
and the following bindings have been made
  Binding [NeedCustomer Dim:Customer Order:{any}] [BilltoCus Order*]
  and if we are in the context of (Order:543210 Date: 4/15/93 Item:123) and attempt to match (through an evaluation)
    [ItemPrice Item:123 Date: 1/1/93 . . . 12/31/93 Customer:56781]
    then it would appear that no match can be made because we do not have any point in the Customer dimension in the current context. However, V4 will automatically attempt to evaluate
    [NeedCustomer Dim:Customer]
      and use the result as the value for the Customer dimension for this match. This would match the binding above, re-evaluate to determined the billto customer for the current order and if it equaled Customer:5678 permit the match to succeed.

Binding Numbers

Binding numbers are an important aspect of a large V4 environment. These numbers control bow a binding is to be stored. During a binding, V4 scans all points in the binding intersection from left to right and tracks the first dimension with the highest binding number. This becomes the dimension used as the primary "key" for storing the binding. For this reason, all dimensions with a binding number must be stored as a number—Integer, Dictionary, Time, etc. Alpha, foreign, data elements, etc. cannot have binding numbers.

Append—Appending a Point to a List
Syntax
  Append isct point
isct an intersection evaluating to a list
point the point to be appended
Description
  This command appends the specified point to the list referenced by isct. The intersection must evaluate to a list point or an error is generated.
Example
  Dim ModuleList List
  Bind [Module:xyz Package:pack1] ModuleList:( )
  . . .
  Append [Module:xyz Package:pack1] Variable:foo
Insert—Insert a Point to the Beginning of a List
Syntax
  Insert isct value
isct an intersection evaluating to a list
point a point to be inserted at the beginning of the list
Description
  This command inserts point at the beginning of a list pointed to by isct.
Bind—Bind an Intersection to a Value Point
Syntax
  Bind isct point
isct an intersection
point a point to bound as the value of the intersection
Description
  The Bind command binds an intersection to a value point.
Example
  Bind [OHQty Item:xyz Location:loc23] Quantity:999
Context Add—Adding a Point to the Context
Syntax
  Context Add point
point a point to be added to the current context
Description
  The point is added to the current frame of the current context. If the point is an intersection then it is evaluated before being added to the context.
Example
  Context Add [PreferredLocation Customer: 1234]
Context Examine—Examining the Current Context
Syntax
  Context Examine
Description
  This command generates a list of all points currently active in the context to the user's console.
Context Pop—Popping Frame(s) off of the Context
Syntax
  Context Pop [name]
name the frame name to pop off to
Description
  This command pops of the current context frame or pops off multiple frames until a frame with name is popped.
Context Push—Pushing a New Frame onto the Context
Syntax
  Context Push name
name The name of the frame
Description
  This pushes a new frame onto the current context with the specified name. Points added to the context after the "push" are associated with the frame and are removed from the context when the context frame is popped off.
Dump—Dumping all Intersections Containing a Given Dimension
Syntax
  Dump dimension [filter]
dimension the search dimension. A scan of all bindings in all current areas will be made for any intersection containing the specified dimension.
filter an option filter intersection. If given then only intersections containing all of the points in filter will be output.
Description
  The Dump command is used to exhaustively search all bindings in all open areas for the current context. Any binding containing dimension will be listed. If a filter is specified then an intersection must not only contain dimension but must also have points matching all points in filter.
Example
  The example below will search for all bindings containing the Date dimension and additionally containing the point "Company:CDF" and any IMRef points. Dump Dim:Date [Company:CDF IMRef:(all)]

Evaluate—Evaluate an Intersection
Syntax
   Evaluate intersection
intersection an intersection to be evaluated
Description
   This command evaluates the specified intersection. An error is generated if the intersection cannot be completely evaluated.
Example
   The example below calculates the price for item #1234 as of Mar. 1, 1993 for the BillTo customer of the current order
Eval [Price IMRef:1234 Date: 3/1/93 [BilltoCusRef Order*]]
Exit—Exit from the V4 Interpreter
Syntax
   Exit
Description
   The "Exit" command closes all open areas and exits from the V4 interpreter.
Include—Execute Commands from a File
Syntax
   Include file
file a file containing V4 interpreter commands to be executed
Description
   This command redirects the command input to the specified file. All lines in the file will be executed as V4 commands, macro expansions or macro definitions. The "Include" command may be nested to any reasonable limit.
=—Evaluate an Intersection
Syntax
   =intersection
intersection an intersection to be evaluated
Description
   This command evaluates an intersection and outputs the resulting point to the user's console.
Set Echo—Enables Echoing of Command Lines
Syntax
   Set Echo ON
   Set Echo Off
   Set Echo n
   Set Echo ALL
Description
   This command enables or disables the echoing of input lines to the V4 interpreter. The echo state of an Included file is one less then the state of the issuing the Include command. Setting the echo to ON enables echoing of the current level only. Setting the echo to ALL enables echoing for the current level and all nested levels. Setting the echo to a number n enables echoing for the current level and n−1 nested levels.
Set Parameter—Set a Global Substitution Parameter
Syntax
   Set Parameter letter value
letter a letter from "A" to "Z" which denotes the parameter
value any value to be associated with the parameter
Description
   Global parameters may be set and reset at any time within a V4 interpretive session. A parameter may be referenced by enclosing it's name with braces.
Example
   Set Parameter A Vendor
   Bind [Name {A}:123] Alpha:"Smith Supplies"
Set Result—Enable/Disable Echo of Bindings
Syntax
   Set Results ON
   Set Results OFF Description
   This Set option controls the outputting of binding information after each Bind command.
Set Trace—Enable/Disable Evaluation Tracing
Syntax
   Set Trace mode
mode for different tracing modes. The current values are 0 to disable tracing, 1 for nominal tracing and 8 for fuller tracing.
Description
   This command controls the handling of the trace facilities within the V4 intersection evaluator.
Set MacroBind—Controlling the Placement of Macro Definitions in an Area
Syntax
   Set MacroBind isctmask point
isctmask in intersection mask that is used with the current macro name to form a complete intersection.
point a point used to store the macro. This point is usually specified as "dimension:{new}" to ensure that the macro is written as a new point in the same area that the above intersection is stored.
Description
   This option is used to control how macros are stored in a V4 area. The intersection mask, isctmask, should contain an asterisk "*" which is replaced with the name of the current macro. The point is evaluated and the integer value associated with the point is used as a unique key to store the macro in the "BigText" format. The intersection and value are bind'ed together and the binding area selected is also used to store the actual macro.
Example
   Dim Macro Int Unique
   Set MacroBind [*Dim:Macro] Macro:{new}
Set MacroCall—Determine the Access of a Macro
Syntax
   Set MacroCall isctmask
isctmask an intersection mask
Description
   This command is used to control how macros are found by the V4 interpreter. In most cases, the intersection mask, isctmask, is identical to that of the Set MacroBind settings used to store the macros.
Example
   Set MacroCall [*Dim:Macro]
Set TextBind—Control the Saving of a BigText Buffer in an Area
   Set TextBind isctmask point
isctmask in intersection mask that is used with the current macro name to form a complete intersection.
point a point used to store the macro. This point is usually specified as "dimension:{new}" to ensure that the macro is written as a new point in the same area that the above intersection is stored.
Description
Example
   Set TextBind [Macro:{Context} Dim:Macro] [Macro:{New}]

| Dimension Types | |
| --- | --- |
| Alpha | A character string |
| BigText | A large, multi-line chunk of text |

Dimension Types

| | |
|---|---|
| Binding | A V4 Binding |
| Compound | A compound intersection used in iterations |
| Context | A context point, expanded into components upon evaluation |
| DataEl | A data element specification (the offset, length, datatype, etc.) |
| Dictionary | A dictionary point-stored as a number, displayed as a keyword |
| Foreign | A foreign data structure |
| Integer | An integer number |
| Intersection | An intersection |
| IntMod | An internal module |
| List | A list of values |
| Logical | A logical (true/false) value |
| MemPtr | A memory pointer |
| PIntMod | A partial internal module |
| PointIndex | A number representing a V4-allocated datastructure |
| Pragma | A pragmatic point (usually invisible) |
| Shell | A shell point, values are other points |
| Special | Points specified with the "{xxx}" construct |
| StructEL | A structure specification |
| Time | A time or transaction point |
| V3Mod | A link to a V3 module |
| V3PicMod | A link to the PIC definition of a V3 module |
| V3ModRaw | A link to a V3 module |

Alpha—Character String
Usage
 Upper and lowercase alphanumerics usually enclosed in single or double quotes. If no quotes are specified then the keyword is converted to uppercase and stored.
Storage Method
 Strings of up to 255 bytes are stored in contiguous bytes with the length of the string in the first byte.
Example
 Dim ModuleName Alpha
 Bind [Name Module:1233] Alpha:"ConversionMod"
Special Case
 The Alpha dimension is a defined within the V4 kernel. A quoted string not prefaced with a dimension name is assumed to be a point on the Alpha dimension. Alpha:"Now is the time" is the same as
 "Now is the time"
BigText—Large Text Arrays
Usage
 This dimension type is used to store large amounts of text (via the BigBuf format) as a V4 point.
Storage Method
 The point itself is stored as an integer value and is used as a key to obtain the actual data.
Binding—A Binding Point
Usage
 Binding points cannot be explicitly referenced. These are internal points created whenever an intersection is bound to a value point. The last binding point created can be referenced via
 binddim::{Binding}
Storage Method
 Bind points are stored as a special data structure

```
struct V4DPI_BindPointVal        /* Format of Value for a
*/                                  Binding Point
{unsigned short Dim ;            /* Dimension */
unsigned short BindId ;          /* Binding Id in list */
int DimPntVal ;                  /* Point Value for binding list
```
(these first 3 fields used to form key) */
unsigned short AreaId ;          /* AreaId of area containing
binding list */
} ;

Compound—Compound Intersections for Iterating
Usage
Storage Method
Example
 ! How to sequence thru a sequential Text file
 Bind [Sequence FileName={ALL}] [IntMod=MakeSeq_TextFile
 FileName={BINDING}]
 Bind [Next Sequence=NextFile FileDesc={ALL}] [IntMod=Next_TextFile
 FileDesc={BINDING}]
 Bind [Loop SeqPnt={ALL}] Iter=[Next SeqPnt={BINDING}],[IntMod=Echo
 Iter={Context}]
 Bind [List FileName={ALL}] Iter=[Next SeqPnt={Binding}],[IntMod=Echo
 Iter={Context}] | [Sequence FileName={BINDING}]
 =[List FileName=
Context—A Context Point
Usage
 A context point is composed of a list of other points. When a context point is used as a component point of an intersection to be evaluated, each of its components are added to the context. Thus it is not explicitly a point to be matched.
Storage Method
 Context points are stored as a any other V4 list.
DataEl—A Data Element
Usage
 (fileref, element, name, dimname, v3datatype, keynum, owner, offset, bytes, decimals)

| | |
|---|---|
| fileref | the file reference number |
| element | the element number for this field |
| name | the name of this field |
| dimname | the dimension name (or V3 object name) |
| v3datatype | the V3 datatype code (see /DT_xxx/) |
| keynum | the key number if field is a key |
| owner | the structure id owning this field |
| offset | the offset within the owner structure |
| bytes | the number of bytes for this field |
| decimals | the number of decimal places implied in this field |

The point is stored as a small datastructure containing the fields above in a packed format.
Dictionary—A Dictionary Entry
Usage
 A dictionary entry is a any keyword which is internally stored in a V4 dictionary and then treated as an integer number. This number is encoded with the area hierarchy and unique dictionary entry number so that dictionary entries can be correctly maintained in a multi-area V4 environment.
 Dictionary entries usually take up less space than alpha keywords but take longer to format on input and output because of the additional lookup required. Dictionary entries are most often used when a alpha field requires binding potential. Use of the dictionary permits the designer to reference points as keywords yet let V4 treat the points as integers.

Storage Method
   Dictionary entries are four-byte integers.
Foreign—Foreign Data accessed programmatically.
Integer—Integer Numbers
Usage
   Integer numbers are input and used as in any other language.
Storage Method
   Currently V4 supports four-byte integers.
Example
   Dim MonthofYear Integer
Intersection—A V4 Intersection
Usage
   An intersection is composed of
      a left bracket which begins the intersection one or more points
      an optional vertical line
      optional points after the vertical line
      a closing right bracket which ends the intersection
   An intersection cannot contain more than one point in any given dimension!
Storage Method
   Intersections are stored in the value portion of a point. Since there is a maximum size of a point (which is determined when the V4 program is built) there is a limit to the complexity of an intersection.
IntMod—V4 Internal Module
Usage
   The IntMod dimension provides the designer with a variety of computational primitives directly within V4. An IntMod point is treated as a two valued intersection. The first value references the particular internal module. The second value is a list of points which are the arguments to the module. Since the second argument is a list there are no restrictions regarding duplication of dimension.
   The syntax for a IntMod has been defined to keep it similar to that of a procedural language
      modulename (arg1 arg2 . . . argn)
List—A list of points
Usage
   A list is simply a list of points enclosed in parentheses. There are no restrictions on the points within a list and points may be intersections or other lists.
Logical—Logical True & False
Usage
   This dimension type is used to store simple boolean True/False. Points may be specified by any of the following keyword
      True
      False
      Yes
      No
Storage Method
   Point of this type are stored as integer zero or one.
MemPtr—Memory Pointer
Usage
   Memory pointers are used to reference specific memory locations. These are primarily for special V3 or V4 modules (such as the V4 IntMod handling V4IS). Memory pointers cannot be defined on input. On output they are displayed as hexadecimal values.
Storage Method
   Memory pointers are stored as 32-bit or 64-bit pointers depending on the host platform.
PIntMod—Partial Internal Module
Usage
   The PIntMod dimension type is used
Example
   Dim Real Int
   Dim Service Dict
   Bind [GasPrice] Real:105
   Bind [GasPrice Type:Unleaded] [ ]Plus(Real:10)
   Bind [GasPrice Service:Full] [ ]Plus(Real:7)
   Bind [GasPrice Service:Full] [ ]Plus Real:7]
PointIndex—Index to Internal Point
Usage
   Points of this type are created by special V3 and V4 modules where extensive and possibly mysterious allocations and workings are required. One example is in the generation of sequences from lists. A V4 sequence must be a single point representing several points some of which may change with time. The PointIndex point type permits V4 to assign a unique id to a point and be able to link that point to an internal V4 datastrucuture which may change size/position with time.
Storage Method
   Points of this type are stored as integers. However each active point of this type links up to a memory chunk which may be of considerable size.
Pragma
Usage
   This is an internal dimension type used for points needed by V4 to make certain things work. The normal user of V4 will not encounter this type of point.
Storage Method
   There is no standard model for this point type.
Shell—A Dummy Dimension for Holding another Point
Usage
   This dimension type is a "dummy" dimension whose points are simply points on other dimensions. It is used primarily to differentiate multiple points which may share common dimensions in an intersection (remember that an intersection cannot contain more than one point in any given dimension).
Storage Method
   This type simply stores another point as its value.
Special—Special Points
Usage
   All points with values of the "{xxx}" form are assigned the point type Special. V4 evaluates points of this type to actual V4 points at the appropriate time.
Storage Method
   All special points are represented in the V4 point header area.
StructEl—Structure Elements
Usage
   This point type is used to represent V3 data structures (as opposed to the fields within a structure). The components of this point type are as follows (fileref, structnum, element, bytes, occurs, countfield, offset)

| | |
|---|---|
| fileref | the file reference number |
| structnum | a unique structure number |
| element | a unique element number |
| bytes | the total number of bytes in one occurrence of this structure |
| occurs | the total number of times this structure occurs in parent |
| countfield | a reference to a count field (if one exists) |
| offset | the starting offset in the parent structure |

This point type is represented as a special V4 packed data structure.

Time—Time/Transaction Ids

Usage

Points of this type represent time or transaction ids. Bindings containing these points are matched somewhat differently than other bindings. The difference is that if a dimension point is not explicitly in the context then it's "current" value is assumed and the point on that dimension which is closest to the "current" value, but not greater is matched. What this means is that if no specific context point is specified then the most recent point on that dimension is the favored point.

This is basically how we handle time—if no specific time is mentioned then the current time is assumed and the last "statement" given is the one we are referring to. If a particular time is given (be it past or future) then that becomes the temporary reference point.

Storage Method

Time points are stored as integer values. Time points in a binding cause the calculation of the binding weight to be altered so that the most recent is always checked first.

Example

Dim Time Time
Dim Tran Time Unique
Bind [TranIld Tran={New}] int=123
Bind [TranId Tran={New}] int=2345
Bind [TranId Tran={New}] alpha="ho ho ho"
=[TranId]
Alpha:"ho ho ho"
Dim B Binding
=Remove_Point(B=(LastBind))
=[TranId]
Int:2345

V3Mod—Evaluation through a V3 Module

Usage

This point type allows V4 bindings to access V3 modules for any type of computations. The arguments to the V3 module are the additional dimension points in the call. The exact format is

[v3mod:module Dim:result argpt argpt ... ]

| | |
|---|---|
| v3mod | is a dimension of type V3Mod |
| module | is the name of the V3 module to be called |
| result | is the dimension of the returned value from V3. The V4 evaluator converts the V3 value into a format consistent with this dimension |
| argpt | arguments to be passed to the V3 module. These are converted from V4 formats to V3 formats. |

Storage Method

These points are stored as character strings representing the V3 module.

Example

Bind [ItemPrice IMRef={ALL}]
[V3Mod=CalcPrice Dim=Int
  [PriceType [PriceRule]] [Discount [PriceRule]]
  IMRef={BINDING}]
/* CalcPrice—Dummy Module to Calcuate Item Price based on "rules" */

{/CalcPrice(rule,discount,imref)
p
  return(123456);
}

V3PicMod—Link to V3 Module Code within V4 Area

Usage

This point type is used to represent V3 module "code" stored in PicMod (position independent code) format within a V4 area.

Storage Method

These points are integers where the value is used to create a key into a V4 area to access the module definition.

V3ModRaw—Call to V3 Module

Usage

This point type is similar to the V3Mod point type in that it calls V3 modules. It differs in that no conversions are done between V3 and V4 datatypes. All arguments passed to V3 are as V4 points, and any result from V3 is expected to be a valid V4 point.

Storage Method

Points are stored as character strings corresponding to the V3 module name.

Internal Modules

Echo—Echoing Points to User's Console

Syntax

Echo (point point ...)
pomt A point to be converted to text display format and output to the user's console.

Description

Evaluates all argument points and displays them on the user's console

Eval—Executes a Command String

Syntax

Eval (stringpt)
stringpt A character string point which is passed to the V4 command interpreter for evaluation.

Description

The stringpt is evaluated and the resulting string is passed to be V4 command evaluator.

Example

Eval(Alpha:"Include test")

Next_TextFile—Obtaining the Next Line of a Text File

Syntax alpha=Next_TextFile(filedesc)
alpha The alpha value of corresponding to the next line in the sequence described by filedesc
filedesc A descriptor describing the text file—previously generated by MakeSeq_TextFile Description This module returns as a point on the Alpha dimension, the next line in the text file described by filedesc. At end-of-file this module does not evaluate.

Example

Context Push MakeSeq_TextFile("file.txt")=Next_TextFile(seqpnt*)

MakeSeq_TextFile—Making a Sequence from a Text File

Syntax seqpnt=MakeSeq_TextFile (filename)
seqpnt A sequence point returned corresponding to the file
filename A string referencing an existing text file.

Description

The filename point is evaluated and the resulting alpha string is treated as a file name. The file is opened by V4 and a sequence point is created from the open file.

ListPoint_GetEl—Obtaining a Specific Point in List

Syntax point=ListPoint_GetEl (list index)
point The point corresponding to the index$^{th}$ element in list
list a list of points
index the element number in the list to return (1 is the first, 2 for the second, etc.)
Description
    Returns the index point in list.
Example
    =ListPoint GetEl(List:('now' 'is' 'the') int:2) Alpha:'is'
ListPointSize—Obtaining the Number of Points in a List
Syntax
    size=ListPointSize (listpoint dimpoint)
point The point corresponding to the index$^{th}$ element in list
list a list of points
index the element number in the list to return (1 is the first, 2 for the second, etc.)
Description
    Returns the size of the listpoint as a point on dimpoint.
Next_ListPoint—Getting the Next Point in a Sequence
Syntax
    point=Next_ListPoint (seqlist index seqpnt)
point The point corresponding to the index$^{th}$ element in list
seqlist a sequence list
index the element number in the list to return (1 is the first, 2 for the second, etc.)
seqpnt the sequence point
Description
    Returns the next point in the sequence.
FastNext_ListPoint—Getting the Next Point in a Sequence (Fast Version)
Syntax
    point=FastNext_ListPoint seqpnt
point The point corresponding to the index$^{th}$ element in list
seqpnt a sequence point
Description
    Returns the next point in the sequence without going through all of the nonsense of Next_ListPoint.
MakeSeq_ListPoint—Making a Sequence from a List
Syntax
    seqpnt=MakeSeq_ListPoint (list)
point The point corresponding to the index$^{th}$ element in list
list a list of points to be converted to a sequence
Description
    Creates a new sequence from list and returns a new sequence point which may be used to sequence through the list.
Skip_ListPoint—Skipping Points in a Sequence
Syntax
    point=Skip_ListPoint (seqlist skipnum seqpnt)
point The point corresponding to the index$^{th}$ element in list
seqlist a sequence list
skipnum a positive or negative number of points to skip in the list
seqpnt the sequence point
Description
    Skips points, forwards or backwards in the list.
Pos_ListPoint—Positions to a Specific Point in a Sequence
Syntax
    point=Pos_ListPoint (seqlist posnum seqpnt)
point The point corresponding to the index$^{th}$ element in list
seqlist a list of points
posnum the position in the list
seqpnt the sequence point
Description
    Positions to a specific point in a list/sequence. The first point is posnum=1.

Add_ListPoint—Adding Points to a Sequence
Syntax
    point=Add_ListPoint (seqlist skipnum seqpnt addpoint)
point The point corresponding to the index$^{th}$ element in list
seqlist a list of points
skipnum the number of points to skip
seqpnt the sequence point
addpoint the point to be added
Description
    Adds a point to a sequence.
Open_V4IS—Opening a V4IS Area
Syntax
    dimptr=Open_V4IS (filename structses dim)
dimptr a point on the dim dimension corresponding to the pcb for the open file
filename an alpha file/area name to be opened
structses a structure element point describing the particular file in the area to be opened.
dim a dimension to be used for a return value
Description
    Opens the V4IS area specified by filename, allocates an internal buffer as specified by structses and returns a pointer to the pcb associated with the open area as a point on dimension dim.
Get_V4IS—Getting a Record Buffer from a V4IS Area
Syntax
    dimptr=Get_V4IS (pcbptr keyfielddes keyvalue dim)
dimptr a pointer to the record on point dim.
pcbptr a pointer to the pcb for the area
keyfiledes a data element descriptor corresponding to the key
keyvalue the key to be used
dim a dimension for the return result
Description
    Gets the specified record in the area. If the record cannot be found then the module does not evaluate.
Field_V4IS—Pulling a Field Value from a Buffer
Syntax
    valuept=Field_V4IS (recptr despt)
valuept a point corresponding to the value retrieved from the buffer. The dimension of the point is determined by the dimension embedded in the despt.
recptr a pointer to the record buffer
despt a data-element descriptor
Description
    This module pulls a field from a record buffer and returns the result as a point on the dimension specified within the data element descriptor point.
S1bcField_V4IS—Pulling a Field Value from a Substructure (by Content)
Syntax
    valuept=S1bcField_V4IS (recptr des searchdes searchval)
valuept the point extracted from the substructure
recptr a record pointer
des the data element descriptor for the point to be extracted
searchdes a dataelement descriptor for the field within the substructure to be searched
searchval the value to look for within the substructure
Description
    This module is used to find a particular instance of a field in a repeating substructure based on the value of another field within the same substructure.
Example
    Suppose an inventory record had a repeating substructure for historical information. One field in the substructure was the month, another was the ytd sales as of that month. The S1bcField_V4IS module can be used to get the ytd sales for a particular month without having to explicitly search the substructure.

S1bcField_V4IS([CurrentRec] [YTDSales Dim:IM] [MonthofSale Dim:IM] Month*)

Field_V4IS—Pulling a Field Value from a Substructure (by Index)
Syntax
valuept=S1bxFieldV4IS (recptr des index)
recptr the record pointer
des the data element to be extracted
index the element number in the substructure to return (1 is the first, 2 for the second, etc.)
Description
This module extracts the index$^{th}$ occurrence of the des from the record buffer.
Set_Context—Setting a Context Point
Syntax
Set_Context (point)
point Any V4 point
Description
Adds the point to the current context (current frame).
Load_V3PicMod—Loading a V3 Module from a V4 Area
Syntax
Load_V3PicMod (modulept)
module A point specifying the module name (text)
Description
Loads the specified module from a V4 area into the current V3 runtime environment.
Example
v3_set_parameter(/undefined_module/,
"Eval Load_V3PicMod([V3Mod=* Module])");
UnLoad_V3PicMod—Unloading a V3 Module from the Runtime Environment
Syntax
UnLoad_V3PicMod (modulename)
modulename the alpha name of the module
Description
Unloads a module from the current running V3 environment.
MakeSeq_DimUnique—Making a Sequence of Points within a Dimension
Syntax
listseq=MakeSeq_DimUnique (dim listdim)
listseq a point representing the sequence
dim a dimension which has been declared with the Unique attribute and has had one or more points created with the dim:(new) construct.
listdim a dimension to be used for returning the value.
Description
Dimensions declared with the Unique attribute are tracked by the V4 handlers. Each time a new point is created, it is stored in an internal list. This module is used to create a sequence of all such points (for all areas currently loaded into the V4 context).
DimUnique—Making a List from a Dimension
Syntax
listpt=DimUnique (dim listdim)
listp A point representing a list of all of the points on the specified dimension
dim the dimension to use (specified as "Dim:xxx")
listdim a dimension to use for the returned list (specified as "Dim:xxx")
Description
This module makes a list of all the points on a particular dimension.

Plus—Adding/Concatenating Points
Syntax
result=Plus(arglist)
result the resulting point
arglist a list of points to be added together.
Description
The Plus module adds or concatenates all points in the arglist. If all points are numeric then the result is the sum of the points returned in the dimension of the first argument. If the points are not all numeric then the result is the concatenation of the string representation of the point.
Minus—Numeric Subtraction
Syntax
result=Minus (arg1 arg2)
result the result returned in the dimension of the first argument
arg1 the first number
arg2 the second number which is to be subtracted from the first
Description
The result point is the integer subtraction of arg2 from arg1.
Mult—Numeric Multiplication result=Mult (arg1 arg2)
result the resulting point in the dimension of the first argument
arg1 the first number
arg2 the second argument to be multiplied by the first.
Description
This module simply multiplies its two arguments.
Example
! Simple Recursive Function
Bind [Factorial Int:{all}] Mult(Int:{Binding} [Factorial I Minus(Int:{Binding} Int:1)]
)
Bind [Factorial Int:1] Int:1
=[Factorial Int:5]
Next_IsctVal—Return the Next Evaluation of an Intersection Sequence.
Syntax
point=Next_IsctVal (seqpnt)
point the point corresponding to the next evaluation
seqpnt a sequence point
Description
This module is used to perform the next evaluation on the sequence and return the result.
MakeSeq_IsctVal—Make a Sequence from an Intersection
Syntax
seqpnt=MakeSeq_IsctVal (isct seqpntdim optionalstart optionalend)
seqpnt the resulting sequence point
isct an intersection to be used as the basis of the sequence
seqpntdim a dimension for the returned result
optionalstart an optional starting index
optionalend an optional ending index number
Description
This module is used to make a sequence of all possible evaluations of an intersection. The first point would be the normal evaluation of the intersection in the current context. The next point would be whatever would have been the result if the first result was not evaluated.
The optionalstart and optionalend points may be given to control where the sequence starts and stops.
Example
This module may be used to sequence through a set/list of values bound with a time dimension point. The net effect would be that each next point would be the next prior point in time.

Remove_Point—Remove a Point from a V4 Area
Syntax
    Remove_Point (point)
point the point to be removed
Description
    Removes the specified point from a V4 area. Currently, the only points which can be removed as binding points . . .

Logical_And—Perform Logical And'ing
Syntax
    point=LogicalAnd (arg1 arg2 [resultdim])
point the result of logically anding arg1 and arg2. If a resultdim point is given then . . .
arg1 the first argument of the and
arg2 the second argument of the and
resultdim the dimension for the resulting point
Description
    Performs a logical and'ing of its two arguments.
Logical_Or—Logical Or Two Points
Syntax
    point=LogicalOr (arg1 arg2 [resultpoint])
point the result of the logical or
arg1 the first argument of the or
arg2 the second argument of the or
resultpoint a dimension for the resulting point
Description
    Logically or's the two argument points.
Logical_Not—Evaluate logical not of argument
Syntax
    point=LogicalNot (arg1 [resultpoint])
point the result of complementing the first argument
arg1 the point to be complemented
resultpoint a dimension for the result
Description
    Logically compliments its argument.
IfTrue—Conditional Evaluation
Syntax
    point=IfTrue (logical truepoint falsepoint)
point The point resulting in the evaluation of either the truepoint or the falsepoint
logical a point evaluating to logical true or logical false, or a number greater than 0
truepoint a point to be evaluated if logical is true.
falsepoint a point to be evaluated if logical is false.
Description
    This module evaluates its first argument, logical. If the result is true then truepoint is evaluated. If the result is false then falsepoint is evaluated.
Note
    If either truepoint or falsepoint are intersections, they should be quoted.
IfDefined—Conditional Evaluation
Syntax
    point=IfDefined (isctpoint definedpoint undefpoint)
    point=IfDefined (isctpoint undefpoint)
point the resulting point
isctpoint a quoted intersection to be "tested"
definedpoint the point to be evaluated and returned if isctpoin is defined
undefpoint the point to be evaluated and returned if isctpoint is not defined.
Description
    This module first determines if the quoted isctpoint is defined (can be evaluated). If yes then the definedpoint is evaluated and returned. In the case where definepoint is not given then the evaluation of isctpoint is return. In either case, if the intersection cannot be evaluated then the result is the evaluation of undefpoint.
Error—Generate and Display an Error
Syntax
    Error (arglist)
arglist a list of arguments to be concatenated and output.
Description
    Concatenates and outputs the points in arglist and then generates a V4 error.
Echo—Concatenate and display arguments on User's Console
Syntax
    Echo(arglist)
arglist a list of points
Description
    Concatenates and displays the points in arglist on the user's console.
EvalList—Evaluate all Points in a List
Syntax
    EvalList (list)
list a list of points to be evaluated
Description
    This module simply steps through all points in list and evaluates each one.
ForEachPushAndEval—Iterate Points in List & Evaluate
Syntax
    ForEachPushAndEval (list evallist)
list a list of points
evallist a list of points to be evaluated
Description
    This module steps through each point in list, pushes it onto the context and then evaluates each point in evallist. It operates similarly to a loop construct in procedural languages.
ForEachApply—Sequence Through List and Apply Points to Intersection
Syntax
    reslist=ForEachApply (list isct [context])
reslist a list of points resulting from repetitive evaluations of isct with the additional point
list The point corresponding to the $index^{th}$ element in list
isct an intersection to be evaluated (with the addition of the points from list)
context an optional context point or list of points.
Description
    This module steps through each point in list, adds the point to isct, and then evaluates the temporary intersection. The last argument, context, may be given to specify context points for the duration of this module.
ForEachPushAndApply—Iterate Sequence/List and Evaluate Intersection
Syntax
    reslist=ForEachPushAndApply (list eval optcontext)
reslist a list of points resulting from the repeated evaluations of eval.
list a list of points
eval an intersection to be evaluated for each point
optcontext an optional context point or list
Description
    This module steps through each point in list, pushes the point onto the current context, and then evaluates eval. The resulting reslist is a list of points resulting from the evaluations.
Sum—Sum all Points in a List
Syntax
    result=Sum(list initpoint)

result the sum of all the points in the list
list a list of points to be summed
initpoint a point specifying the initial point of the sum, usually of the form "dimension:0"
Description
The "Sum" module sets the result to the initial point, initpoint, and then adds each numeric point in the list into the result.

Min—Find Smallest Point in a List
Syntax
　　result=Min (list)
result the smallest point in the list
list a list of numeric points
Description
　　This module returns the smallest numeric point in the list.

Max—Find Largest Point in a List
Syntax
　　result=Max (list)
result the largest point in the list
list any list of numeric points
Description
　　This module returns the largest numeric point in the argument list.

ListFromRange—Create List from Range of Values
Syntax
　　list=ListFromRange (low high resultdim)
list the resulting list point
low the first or low point in the list
high the last or high point in the list
resultdim the dimension of the result
Description
　　This module creates a list from the specified begin and end points of a range.

ListFromStartNumber—Create List from Starting Point and Number
Syntax
　　list=ListFromStartNumber(start number resultdim)
list the resulting list point
start the starting point of the list
number the number of points in the list
resultdim the dimension for the result
Description
　　This module creates a list from a starting point and number of points.

REFERENCE

Introduction

Structure Definitions—Token Generator

```
dcl struct V4LEX_TknCtrlBlk {
    int tcb_lines;                              /* Total lines processed thru TCB */
    int tcb_tokens;                             /* Total tokens */
    short opcode;                               /* Opcode-V_Oper_xxx is type is punctuation */
    short prec;                                     /* Default operator precedence if
punctuation */
    short type;                                     /* Token result - see
V4LEX_TknType_xxx */
    short need_input_line;                  /* Nonzero if need new input line */
    short ifxilx;                               /* ilx defining ifx */
    short ifx;                                      /* Index to below */
    struct ifs[20] {
        short doif;                             /* Execute commands in IF portion */
        short doelse;                           /* Execute commands in ELSE portion */
        short inif;                             /* TRUE if in IF portion */
        string #V4LEX_Tkn_KeywordMax name;      /* Optional IF level name */
    };
    short ilx;                                      /* Index to below */
    struct ilv}[#V4FLEX_Tkn_InpLvlMax] {
        int mode;                                   /* Input mode- V4LEX_InpMode_xxx
*/
        pointer file;                           /* Input file desc pointer) */
        pointer strptr;                         /* Points to string if =
V4LEX_InpMode_String */
        alpha #V4LEX_Tkn_InpLineMax input_str;  /* Current input line */
        pointer input_ptr;                      /* Pointer to next byte in input_str */
        short echo;                                 /* If TRUE then echo input lines */
        string #V4LEX_Tkn_PromptMax-1 prompt;       /* Prompt if input is user tty */
        short statement_start_line;         /* Line number current statement started on */
        short current_line;                 /* Current line number */
        short total_lines;                      /* Total lines in this file */
        string 127 file_name;               /* File name (or nothing) for this level */
        short last_page_printed;            /* Set on error (to avoid extra print-out) */
        pointer arglist;                            /* Pointer to string of macro arguments */
        short BoudnMacroArgs;               /* TRUE if macro args below have been bound */
        short HaveMacroArgNames;                /* True if we got macro argument names below
*/
        struct macarg[#V4LEX_Tkn_ArgMax]{
            strint #V4LEX_Tkn_KeywordMax name;  /* Optional macro argument name */
            pointer value;                          /* Pointer to macro argument */
        };
    }
    pointer prior_input_ptr;                /* Pointer to begin of token (for lookahead */
    short have_lookahead;                   /* If true then re-tokenize prior token */
    short lookahead_flags;                  /* Flags from prior call to NextTkn */
    short have_value;                           /* last token returns a value (for unary minus)
```

-continued

```
  short in_comment;                          /* If true then in a comment */
  short check_initialized;                   /* If true then check initialized stack vars */
  string#V4LEX_Tkn_KeywordMax keyword;       /* If a keyword then the keyword
string */
  short keyword_len;                         /* Length of keyword */
  short actual_keyword_len;                  /* Actual length before possible truncation */
  short default_radix;                       /* Default Radix (usually 10) of literal integer
*/
  short radix;                               /* Radix (usually 10) of current literal
integer */
  short literal_len;                         /* If a literal then length */
  int integer;                               /* Value if literal integer */
  short decimal_places;                      /* Number of decimal places */
  real floating;
  string #V4LEX_Tkn_StringMax-1 string;
  struct poundparam[26]
  {string #V4LEX_Tkn_KeywordMax value;
  };                                         /* Values for #A# . . . #Z# */
};
dcl value V4LEX_TknType_String               /* A string literal (enclosed in quotes) */
dcl value V4LEX_TknType_Keyword              /* Keyword, converted to upper case */
dcl value V4LEX_TknType_Integer
dcl value V4LEX_TknType_Float
dcl value V4LEX_TknType_EOL
dcl value V4LEX_TknType_Punc                 /* Punctuation, stored in tbc->keyword */
dcl value V4LEX_InpMode_Stdin                /* Pull input from stdin */
dcl value V4LEX_InpMode_File                 /* Pull from a file */
dcl value V4LEX_InpMode_String               /* Pull from a string */
dcl value V4LEX_Option_PushCur               /* Repush current so next call returns it again
*/
dcl value V4LEX_Option_RetEOL                /* Return EOL as a "token" (for line parsing) */
dcl value V4LEX_Option_ForceKW               /* Try to force next token as keyword */
dcl value V4LEX_Option_NegLit                /* Treat leading "-" as part of negative number
*/
dcl value V4LEX_Option_ForceAsIs       /* Break input into tokens, return "as is" */
                                    /* as string (for accepting macro defs) */
dcl value V4LEX_Option_ExpandArgs            /* Force expansion of "#n#" */
dcl value V4LEX_RPPFlag_EOL                  /* Treat end-of-line as end of expression */
dcl value V4LEX_RPPFlag_Semi                 /* Treat ";" as end of expression */
dcl value V4LEX_RPPFlag_PushParens           /* Push parens, brackets, etc. as operators */
dcl value V4LEX_RPPFlag_ImplyAnd             /* Inject implied "&" between two adjacent
vals */
dcl value V4LEX_RPPFlag_ColonKW              /* Force a "keyword" after a colon */
Data Structures - Parsing
dcl value V4LEX_RPP_LineMax                  /* Max characters in parse line */
dcl value V4LEX_RPP_AlphaValMax        /* Max characters in alpha token */
dcl value V4LEX_RPP_TokenMax                 /* Max number of tokens */
  short MapCount;                            /* First "n" below to be eval'd as "bitmap" once
*/
  short Count;                               /* Number below */
  struct Token[#V4LEX_RPP_TokenMax]
    { short Type;                            /* Type of token */
      short Prec;                            /* Precedence (if operator) */
      short dps;                             /* Decimal places */
      short OpCode;                          /* Opcode (0 if not operator)- see V_Oper_xxx
*/
      int IntVal;                            /* Integer value of token */
      real Floating;                         /* Floating value */
      string #V4LEX_RPP_AlphaValMax-1 AlphaVal;   /* Alpha value of token */
    };
};
Data Structures - Big Text
dcl value V4LEX_BigText_Max                  /* Max bytes in big buffer */
dcl struct V4LEX_BigText                     /* Format of a V4 "Big Text" Entry */
{int kp[2];                            /* Type = V4, Subtype=BigText, Mode=Int, Len=8 */
  int Key;                                   /* Key for entry (usually [Unique] V4
point) */
  int Bytes;
  alpha #V4LEX_BigText_Max BigBuf;           /* Buffer for text */
}
Data Structures - V4IS
dcl struct V4IS_ParControlBlk
{ string 31 V3name;                    /* V3 name for linkage to V3 error controls */
  string 120 Filename;           /* Area File Name */
  int OpenMode,LockMode,BktSize;
  int AccessMode;
  int MinCmpBytes;                     /* Compress any records greater than this number */
  int MaxRecordLen;                    /* Max record length allowed */
```

-continued

```
    int RelHNum;                          /* Relative Hierarchy Num (0 for foreign only) */
    string 250 BindCatList;               /* Binding Categories for Area */
    pointer FilePtr;                      /* Point to actual file */
    int GetMode,PutMode;                  /* Get & Put Modes */
    int DfltGetMode,DfltPutMode;
    int GetLen;
    int GetCount,PutCount;
    int DatMode,DfltDataMode;
    int AreaId;                           /* AreaID associated with this PCB */
    int DataId;                           /* DataID currently/last associated */
    pointer DfltPutBufPtr,PutBufPtr;          /* Put Buffer */
    int DfltPutBufLen,PutBufLen;
    pointer DfltGetBufPtr,GetBufPtr;
    int DfltGetBufLen,GetBufLen;
    pointer DfltKeyPtr,KeyPtr;
    int DfltKeyNum,KeyNum;
    int DfltFileRef,FileRef;                  /* Current FileRef (0 for internal) */
    pointer DataPtr;                      /* Updated to poing to data in V4MM Buffer */
    int DataLen;                              /* to len if no copying */
    pointer KeyInfo;                      /* Points to key info on create of new area */
    short AuxLinkCnt;                     /* Number of link PCBs below */
    struct Link[10]
        { int LinkFileRef;                    /* FileRef we are linking to */
          pointer PCBPtr; /* Link to other PCB if AuxVal is in different area */
          pointer ffs; /*Link to foreign file info */
        };
    };
Data Structures - Dimensions
    dcl struct V4DPI_DimInfo
    { int KeyPrefix;                      /* Type=v4, SubType=DimINfo, Mode=Int,
    Length=8 */
        int DimId;                            /* Dim code (actually dict entry for
Dim name) */
        string 31 DimName;
        short PointType;                  /* Type for this dim - V$DPI_PntType_xxx */
        short PointVerify;                /* How to verify (accept) this point */
        short RangeOK;                    /* TRUE if point ranges (xxx.yyy) are allowed
*/
        short ListOK;                     /* TRUE if point lists (xxx,yyy,zzz) are allowed
*/
        short IsModule;                   /* TRUE if point links to external (V3) module
*/
        short UniqueOK;                   /* Allowed to specify point as dim=(NEW) */
        short DictType;                   /* Dictionary type - V4DPI_DictType_xxx */
        int BindList;                     /* Dimension can become key to BindList
entry */
        short ExpandMacro;                /* Number of bytes in macro below */
        string 100 MacroBuf;              /* Macro buffer to expand on point acceptance */
        short RelHNum;                        /* Relative Hierarchy Num (for bindings) */
        string 31 RelHCategory;           /* Category code for bindings */
        short RelHReview;                     /* When to review RelHNum */
        string 31 AcceptorModule;         /* Name of V3 Acceptor module */
        int AcceptorObject[2];            /* OBJREF for acceptor module */
        string 31 DisplayerModule;        /* Name of V3 Displayer module */
        int DisplayerObject[2];           /* OBJREF for displayer */
                                              /* Following MUST be at end
of dimension info!! */
        alpha 300 AutoCtxPnt;             /* If no NULL then to be used for Auto-Context */
};
dcl struct V4C_AreaHInfo
    { short RelHNum;                          /* Relative Hierarchy Number */
      short ExtDictExists;                /* External dictionary exits in this area */
      short IntDictExists;                /* Internal dictionary exists in this area */
      short ExtDictUpd;                       /* If TRUE then OK to update external */
      short IntDictUpd;                       /* If TRUE then update internal */
      short BindingsExist;                /* If TRUE then bindings exists */
      short BingingsUpd;                      /* If TRUE then OK to update bindings */
      short IsPrimary;                        /* If TRUE then primary area (otherwise a slave) */
      string 250 BindCatList;             /* String list of binding categories */
      short BindCatUpd;                       /* 1 to replace, 2 to append */
};
```

A Computer Program Listing Appendix on a CD Rom has been filed with the U.S. Patent and Trademark Office in duplicate and the Information contained therein is incorporated herein by reference. The files, their date of creation and their sizes bytes are as follows:

| Name | Date Created | Size |
|---|---|---|
| Annotated Y4 Examples | Wed, Jul 14, 1993, 1:21 AM | 32 K |
| HOCKER.Y3 | Thu, Apr 12, 1990, 6:57 AM | 8 K |
| HOCKER.Y4B | Thu, Apr 12, 1990, 6:57 AM | 4 K |
| MIDAS1RE.Y4B | Thu, Apr 12, 1990, 6:57 AM | 224 K |
| MIDASINF.Y4B | Thu, Apr 12, 1990, 6:57 AM | 12 K |
| Y Environment | Tue, Jul 14, 1992, 12:35 AM | 4 K |
| v3defs.c | Tue, May 25, 1993, 12:17 AM | 80 K |
| v3driver.c | Tue, May 25, 1993, 12:18 AM | 20 K |
| v3edtu.c | Tue, May 25, 1993, 12:18 AM | 64 K |
| v3iou.c | Tue, May 25, 1993, 12:18 AM | 68 K |
| v3mscu.c | Tue, May 25, 1993, 12:18 AM | 24 K |
| v3mthu.c | Tue, May 25, 1993, 12:18 AM | 20 K |
| v3oper.c | Tue, May 25, 1993, 12:18 AM | 84 K |
| v3pcku.c | Tue, May 25, 1993, 12:18 AM | 32 K |
| v3prsa.c | Tue, May 25, 1993, 12:18 AM | 60 K |
| v3prsb.c | Tue, May 25, 1993, 12:18 AM | 100 K |
| v3prsc.c | Tue, May 25, 1993, 12:18 AM | 48 K |
| v3prsd.c | Tue, May 25, 1993, 12:18 AM | 40 K |
| v3prsdef.c | Tue, May 25, 1993, 12:18 AM | 8 K |
| v3sobu.c | Tue, May 25, 1993, 12:18 AM | 40 K |
| v3stru.c | Tue, May 25, 1993, 12:18 AM | 24 K |
| v3v4.c | Tue, May 25, 1993, 12:18 AM | 40 K |
| v3xctu.c | Tue, May 25, 1993, 12:18 AM | 52 K |
| v3xvm.c | Tue, May 25, 1993, 12:18 AM | 4 K |
| Y4 Primer (MIF abridged) (Word5) | Tue, Jul 27, 1993, 5:18 PM | 92 K |
| Y4 Primer (MIF abridged) | Tue, Jul 27, 1993, 5:16 PM | 1.8 MB |
| Y4 Primer (MIF) | Wed, Jul 14, 1993, 3:02 AM | 2.1 MB |
| Y4 Primer (MIF) (Word5) | Tue, Jul 27, 1993, 3:55 PM | 120 K |
| Y4 Primer (MIF) 1 | Tue, Jul 27, 1993, 4:10 PM | 944 K |
| Y4 Primer (MIF) 1 (Word5) | Tue, Jul 27, 1993, 4:17 PM | 40 K |
| Y4 Primer.word | Fri, Jul 16, 1993, 9:17 PM | 36 K |
| v4ctx.c | Tue, May 25, 1993, 12:18 AM | 28 K |
| v4defs.c | Tue, May 25, 1993, 12:18 AM | 60 K |
| v4dpi.c | Tue, May 25, 1993, 12:18 AM | 108 K |
| v4eval.c | Tue, May 25, 1993, 12:18 AM | 44 K |
| v4eval.c.word | Wed, May 26, 1993, 2:38 PM | 48 K |
| v4im.c | Tue, May 25, 1993, 12:18 AM | 64 K |
| v4is.c | Tue, May 25, 1993, 12:18 AM | 124 K |

STATEMENT OF INDUSTRIAL UTILITY

The present invention may be useful in data manipulation and representation on a general-purpose digital computer.

It will be appreciated by those skilled in the art that the present invention has been described with reference to specific examples which are not intended as limitations, and which are but a few of the variations which are possible without departing from the spirit of the invention. Accordingly, the scope of the invention should be determined only with reference to the appended claims.

I claim as my invention:

1. A method for representing an information item within the memory of a digital computer comprising the steps of:
   (a) creating one or more DIMENSION data structures comprising at least a dimension name, and point type, and zero or more points;
   (b) creating one or more POINT data structures comprising at least a dimension name, and a value;
   (c) creating one or more BINDING data structures comprising at least a value point, and one or more points wherein all such points have different dimension names from one another, and wherein all such points are collectively labelled an INTERSECTION;
   (d) selecting a group of DIMENSIONS useful for representing said information item, and creating POINTS representative of said information item within each of said selected DIMENSIONS;
   (e) storing within said memory a BINDING representative of said information item, comprising a value POINT representative of said information item, and an INTERSECTION comprising all of said POINTS from said selected DIMENSIONS.

2. The method of claim 1 wherein one or more information items are stored within the memory of a digital computer, comprising the additional steps of:
   (a) creating one or more AREA data structures comprising at least one or more BINDINGS; and
   (b) storing within said AREAs, said BINDINGS representative of said information items.

3. The method of claim 1 wherein said BINDING data structures further contain a binding weight for designating the relative strength of said binding to the strength of other BINDING data structures.

4. The method of claim 3 wherein said BINDINGS are stored within said AREAS in rank order according to their associated binding weights.

5. The method of claim 1 further comprising creating one or more POINT data structures having one or more types selected from the group of "ALPHA", "COMPOUND", "DATAEL", "DICTIONARY", "BLOb", "INTEGER", "INTERSECTION", "INTMOD", "POINTINDEX", "SHELL", "SPECIAL", "STRUCTEL", "CODEMODULE", "UNFORMATTEDCODEMODULE", "CONTEXT", "LIST", "PRAGMA", "MEMPTR", "POSITION INDEP CODE MODULE", "BIGTEXT", "PINTMOD", "TIME", "BINDING", and "LOGICAL".

6. The method of claim 1 further comprising a method for evaluating an INTERSECTION comprising searching said memory for a BINDING containing only each and every POINT within said INTERSECTION, and if such a BINDING is present within said memory, returning the value POINT stored in said BINDING.

7. The method of claim 1 further comprising the steps of:
   (a) creating a CONTEXT data structure comprising a dynamic list of POINTS, no two of which are in the same DIMENSION; and
   (b) storing said CONTEXT data structure separately from and independently of said information item.

8. The method of claim 7 wherein said CONTEXT references one or more AREAs for consideration during evaluation.

9. The method of claim 7 further comprising a method for evaluating a first INTERSECTION and a CONTEXT, comprising searching said memory for a BINDING containing each and every POINT within said first INTERSECTION and one or more POINTS selected from within said context, and if such a BINDING is present within said memory, returning the value POINT stored in said BINDING.

10. The method of claim 9 wherein the fewest number of said POINTS within said CONTEXT are selected.

11. The method of claim 10 wherein the POINTS within said context are stored in a predetermined order, and are selected in said order.

12. The method of claim 10 wherein all values stored in all BINDINGS containing each and every POINT within said first INTERSECTION and one or more POINTS selected from within said CONTEXT are returned, together with a list of the selected CONTEXT POINTS for each value.

13. The method of claim 12 wherein said returned list is evaluated according to a predefined ranking schema to determine the single best returned value.

14. The method of claim 13 wherein said returned list is ordered in decreasing order of binding weight.

15. The method of claim 1 wherein at least one DIMENSION data structure contains at least one entry point to a set of executable computer instructions.

16. The method of claim 1 wherein at least one DIMENSION data structure contains at least one entry point to a data retrieval system containing a computer database.

17. The method of claim 16 wherein said DIMENSION data structure contains a call to an SQL database server.

18. The method of claim 16 wherein said DIMENSION data structure contains access methods for retrieval from an object database.

19. The method of claim 3 wherein said binding weight is equal to a predetermined scalar value associated with said information item.

20. The method of claim 19 wherein evaluation of an INTERSECTION relies on partial inequality of binding weight.

21. The method of claim 19 wherein said scalar value is representative of time.

22. The method of claim 19 wherein said scalar value is representative of a transaction count.

23. The method of information representation of claim 1 further comprising a method for undoing information storage in the memory of a digital computer wherein one or more POINTs is removed from the BINDING DIMENSION, thereby deleting the BINDINGs represented by said removed POINTs from memory.

24. The method of claim 1 further including a security operation wherein each desired operation of a computer system is preceded by evaluation of an INTERSECTION of the form Logical:Yes/No, wherein the CONTEXT contains information such as user, terminal, privileges, objects, operations, and executable code necessary to proper evaluation of said INTERSECTION.

25. The method of claim 1 wherein a SEQUENCE is defined as a POINT used to iterate through a list of POINTS, and SEQUENCE operators comprise Next, Prior, Count, and Position.

26. The method of claim 25 wherein the current CONTEXT is capable of modifying the SEQUENCE operators to change the order in which said list of POINTS is accessed.

27. The method of claim 7 wherein said CONTEXT is determined by implication from an INTERSECTION by iteratively evaluating undefined POINTS in said INTERSECTION through substitution of the value of the autocontext POINT in the DIMENSION of each such undefined POINT until no POINTS in said INTERSECTION remain undefined or the evaluation of an autocontext point fails or the evaluation of the said INTERSECTION fails.

* * * * *